US008233487B2

(12) United States Patent
Kusama et al.

(10) Patent No.: US 8,233,487 B2
(45) Date of Patent: Jul. 31, 2012

(54) COMMUNICATION NETWORK SYSTEM THAT ESTABLISHES COMMUNICATION PATH BY TRANSFERRING CONTROL SIGNAL

(75) Inventors: Kazuhiro Kusama, Tokyo (JP); Shuji Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/034,904

(22) Filed: Feb. 21, 2008

(65) Prior Publication Data
US 2008/0240120 A1 Oct. 2, 2008

(30) Foreign Application Priority Data

Mar. 30, 2007 (JP) ................................. 2007-090213

(51) Int. Cl.
*H04L 12/28* (2006.01)
*H04L 12/56* (2006.01)
(52) U.S. Cl. .................... 370/395.21; 370/229; 370/235; 370/395.2; 370/395.4; 370/400; 709/227; 709/228; 709/232; 709/233
(58) Field of Classification Search ........................ None
See application file for complete search history.

(56) References Cited

U.S. PATENT DOCUMENTS

| | | | |
|---|---|---|---|
| 6,181,680 B1 * | 1/2001 | Nagata et al. ................. | 370/248 |
| 6,496,948 B1 * | 12/2002 | Smorodinsky .................. | 714/37 |
| 7,477,616 B2 * | 1/2009 | Wang et al. .................... | 370/311 |
| 2002/0110087 A1 * | 8/2002 | Zelig et al. .................... | 370/236 |
| 2003/0018787 A1 * | 1/2003 | Neal et al. ..................... | 709/227 |
| 2004/0052257 A1 * | 3/2004 | Abdo et al. .................... | 370/392 |
| 2004/0246912 A1 * | 12/2004 | Hoang et al. .................. | 370/254 |
| 2005/0141527 A1 * | 6/2005 | Gateva et al. ................. | 370/401 |
| 2005/0226325 A1 * | 10/2005 | Dei et al. .................. | 375/240.12 |
| 2005/0270306 A1 * | 12/2005 | Nomura ......................... | 345/619 |
| 2006/0083251 A1 * | 4/2006 | Kataoka et al. ............... | 370/400 |
| 2006/0098657 A1 * | 5/2006 | Vasseur et al. ................ | 370/392 |
| 2006/0120288 A1 * | 6/2006 | Vasseur et al. ................ | 370/235 |
| 2006/0200579 A1 * | 9/2006 | Vasseur et al. ................ | 709/238 |

(Continued)

FOREIGN PATENT DOCUMENTS

JP 2004-193815 7/2004

(Continued)

OTHER PUBLICATIONS

E. Rosen et al., "Multiprotocol Label Switching Architecture", Network Working Group, RFC 3031, Jan. 2001.

(Continued)

*Primary Examiner* — Ayaz Sheikh
*Assistant Examiner* — Peter Chau
(74) *Attorney, Agent, or Firm* — Brundidge & Stanger, P.C.

(57) ABSTRACT

In an MPLS/GMPLS network, a link used by a communication path for each hop and adaptations used at the boundary between management domains or layers are appropriately and automatically selected according to a service type and a required maintenance condition, without making a control sequence complicated. First, a unit for requesting path establishment by including an identifier of a service to be provided and a service attribute in a communication path establishment control message is provided for a source node. Second, a unit for determining a required maintenance condition for a communication path and adaptations according to the service identifier and/or the service attribute is provided for each node. Third, links and nodes through which the communication path passes are determined by comparing each of achievable maintenance conditions for network resources with the required maintenance condition. The determined links, nodes, adaptations are specified as operation parameters in switches and/or interfaces.

15 Claims, 17 Drawing Sheets

U.S. PATENT DOCUMENTS

| | | | | |
|---|---|---|---|---|
| 2006/0221865 | A1* | 10/2006 | Hawbaker et al. | 370/255 |
| 2006/0268682 | A1* | 11/2006 | Vasseur | 370/216 |
| 2007/0019558 | A1* | 1/2007 | Vasseur et al. | 370/248 |
| 2007/0067133 | A1* | 3/2007 | Abe et al. | 702/127 |
| 2007/0214334 | A1* | 9/2007 | Maruyama et al. | 711/165 |
| 2007/0217419 | A1* | 9/2007 | Vasseur | 370/392 |
| 2007/0223917 | A1* | 9/2007 | Nagamine | 398/1 |

FOREIGN PATENT DOCUMENTS

| | | |
|---|---|---|
| JP | 2005-252385 | 9/2005 |

OTHER PUBLICATIONS

E. Mannie, "Generalized Multi-Protocol Label Switching (GMPLS) Architecture", RFC 3945, Oct. 2004.

L. Berger, "Generalized Multi-Protocol Label Switching (GMPLS) Signaling Resource ReserVation Protocol-Traffic Engineering (RSVP-TE) Extensions", RFC 3473, Jan. 2003.

R. Bradford, et al., "Preserving Topology Confidentiality in Inter-Domain Path Computation and Signaling", Jun. 2006.

* cited by examiner

FIG. 2

| INTERFACE NAME | INTERFACE IDENTIFIER |
| --- | --- |
| PACKET INTERFACE PART 11a | 101 |
| PACKET INTERFACE PART 11b | 102 |
| PACKET INTERFACE PART 11c | 103 |
| PACKET INTERFACE PART 11d | 104 |
| PACKET INTERFACE PART 12a | 101 |
| PACKET INTERFACE PART 12b | 102 |
| PACKET INTERFACE PART 12c | 103 |
| PACKET INTERFACE PART 12d | 104 |
| PACKET INTERFACE PART 13a | 101 |
| PACKET INTERFACE PART 13b | 101 |
| PACKET/WAVELENGTH COORDINATED INTERFACE PART 13c | 201 |
| PACKET/WAVELENGTH COORDINATED INTERFACE PART 13d | 202 |
| PACKET/WAVELENGTH COORDINATED INTERFACE PART 13e | 203 |
| WAVELENGTH INTERFACE PART 13f | 301 |
| WAVELENGTH INTERFACE PART 13g | 302 |
| WAVELENGTH INTERFACE PART 13h | 303 |
| PACKET INTERFACE PART 14a | 101 |
| PACKET INTERFACE PART 14b | 101 |
| PACKET/WAVELENGTH COORDINATED INTERFACE PART 14c | 201 |
| PACKET/WAVELENGTH COORDINATED INTERFACE PART 14d | 202 |
| PACKET/WAVELENGTH COORDINATED INTERFACE PART 14e | 203 |
| WAVELENGTH INTERFACE PART 14f | 301 |
| WAVELENGTH INTERFACE PART 14g | 302 |
| WAVELENGTH INTERFACE PART 14h | 303 |
| WAVELENGTH INTERFACE PART 15a | 101 |
| WAVELENGTH INTERFACE PART 15b | 102 |
| WAVELENGTH INTERFACE PART 15c | 103 |
| WAVELENGTH INTERFACE PART 15d | 104 |

FIG. 3

| LINK NAME | LINK IDENTIFIER |
| --- | --- |
| PACKET LINK 51 | [10.0.1.1, 103, 10.20.1.3, 101] |
| PACKET LINK 52 | [10.0.1.1, 104, 10.20.1.3, 102] |
| PACKET LINK 53 | [10.0.1.2, 103, 10.20.1.4, 101] |
| PACKET LINK 54 | [10.0.1.2, 104, 10.20.1.4, 102] |
| PACKET LINK (LSC-LSP) 55 | [10.0.1.3, 201, 10.20.1.4, 201] |
| PACKET LINK (LSC-LSP) 56 | [10.0.1.3, 202, 10.20.1.4, 202] |
| PACKET LINK (LSC-LSP) 57 | [10.0.1.3, 203, 10.20.1.4, 203] |
| WAVELENGTH LINK 61 | [10.0.1.3, 301, 10.0.1.5, 301] |
| WAVELENGTH LINK 62 | [10.0.1.4, 301, 10.0.1.5, 302] |
| WAVELENGTH LINK 63 | [10.0.1.3, 302, 10.0.1.4, 302] |
| WAVELENGTH LINK 64 | [10.0.1.3, 303, 10.0.1.4, 303] |

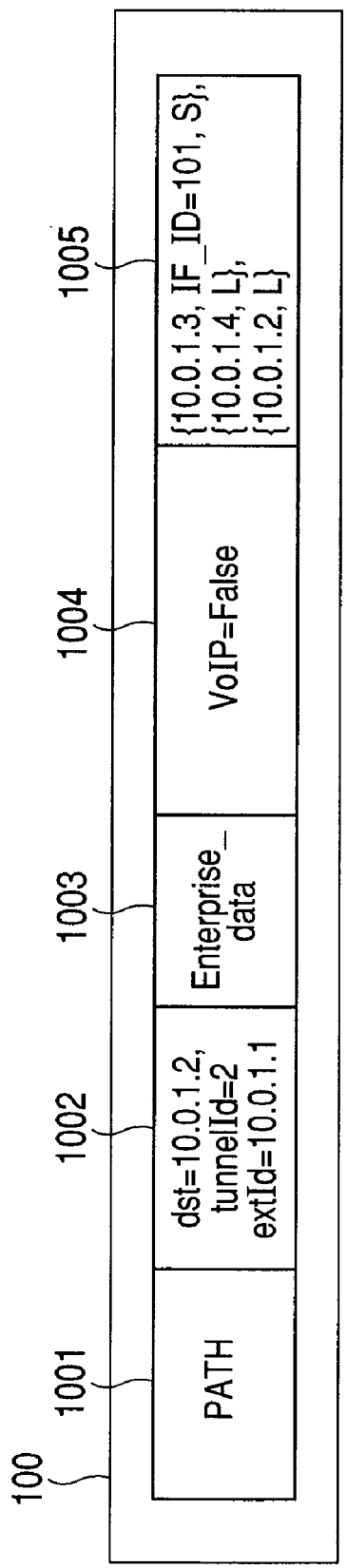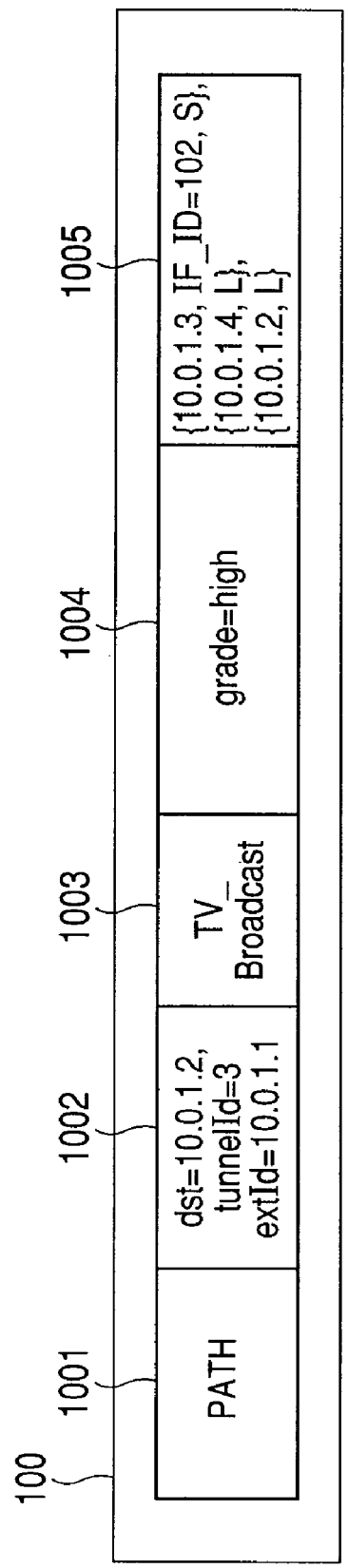

FIG. 11

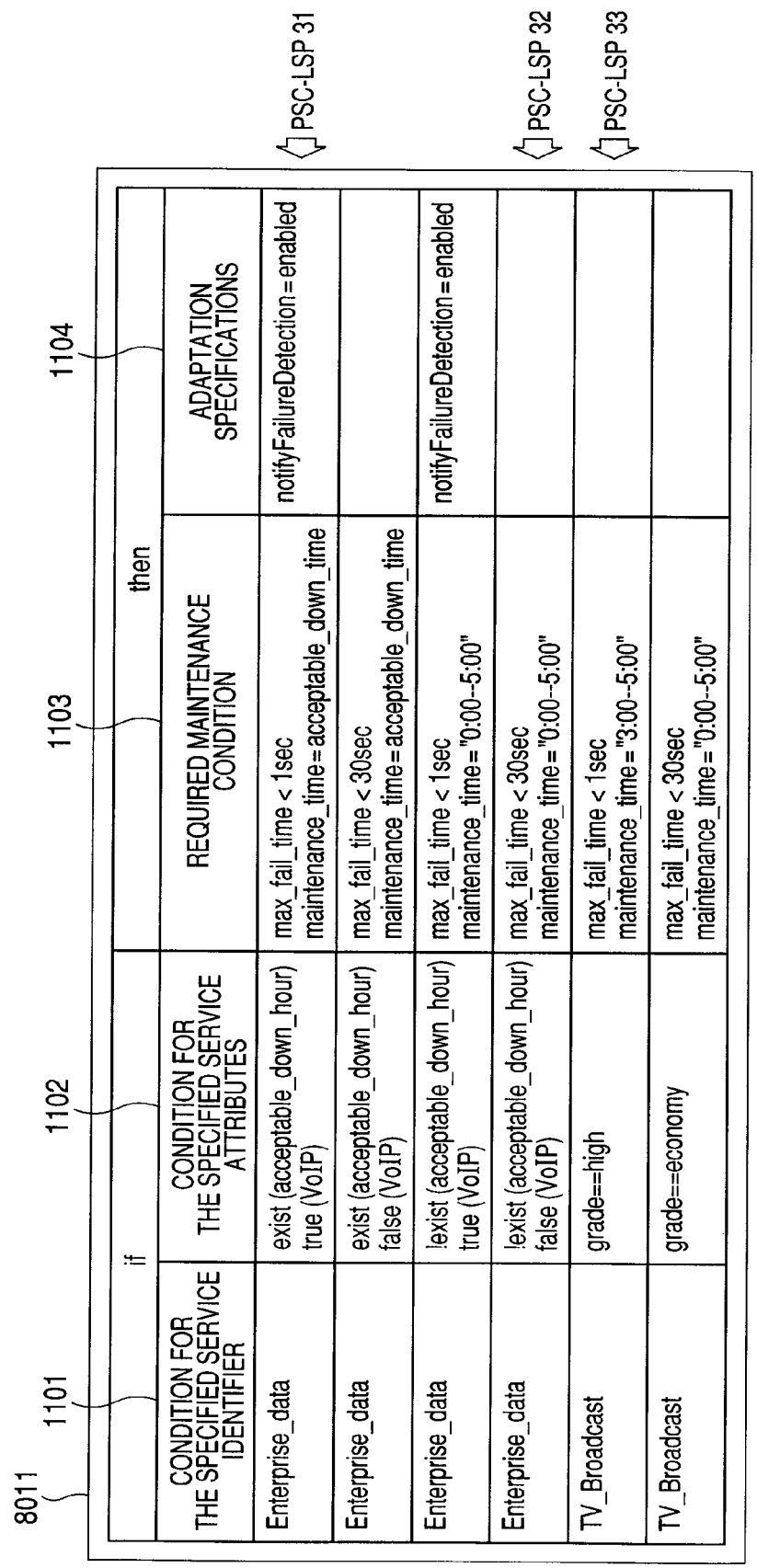

| 8011 | 1101 | if 1102 | then 1103 | 1104 |
|---|---|---|---|---|
| | CONDITION FOR THE SPECIFIED SERVICE IDENTIFIER | CONDITION FOR THE SPECIFIED SERVICE ATTRIBUTES | REQUIRED MAINTENANCE CONDITION | ADAPTATION SPECIFICATIONS |
| | Enterprise_data | exist (acceptable_down_hour) true (VoIP) | max_fail_time < 1sec maintenance_time=acceptable_down_time | notifyFailureDetection=enabled ⇐ PSC-LSP 31 |
| | Enterprise_data | exist (acceptable_down_hour) false (VoIP) | max_fail_time < 30sec maintenance_time=acceptable_down_time | |
| | Enterprise_data | !exist (acceptable_down_hour) true (VoIP) | max_fail_time < 1sec maintenance_time="0:00--5:00" | notifyFailureDetection=enabled ⇐ PSC-LSP 32 |
| | Enterprise_data | !exist (acceptable_down_hour) false (VoIP) | max_fail_time < 30sec maintenance_time="0:00--5:00" | |
| | TV_Broadcast | grade==high | max_fail_time < 1sec maintenance_time="3:00--5:00" | ⇐ PSC-LSP 33 |
| | TV_Broadcast | grade==economy | max_fail_time < 30sec maintenance_time="0:00--5:00" | |

FIG. 12

| 8010 1201 | 1202 | 1203 | 1204 | 1205 | 1206 | 1207 | |
|---|---|---|---|---|---|---|---|
| SWITCHING CAPABILITY | LOCAL INTERFACE | REMOTE EQUIPMENT'S ROUTER IDENTIFIER | REMOTE EQUIPMENT'S INTERFACE IDENTIFIER | OPERATIONAL STATE | LOWER-LAYER'S SESSION IDENTIFIER | LINK'S ACHIEVABLE MAINTENANCE CONDITION | |
| PSC | 101 | 10.0.1.1 | 103 | enabled | - | max_fail_time=300msec<br>maintenance_time="0:00--3:00" | ⇦ PACKET LINK 51 |
| PSC | 102 | 10.0.1.1 | 104 | enabled | - | max_fail_time=300msec<br>maintenance_time="3:00--5:00" | ⇦ PACKET LINK 52 |
| PSC | - | 10.0.1.4 | - | disabled | LSC | max_fail_time=300msec<br>maintenance_time="22:00--0:00" | ⇦ PACKET LINK 55 |
| PSC | 202 | 10.0.1.4 | 202 | enabled | LSC,<br>extId=10.0.1.3<br>dst=10.0.1.4,<br>tunnelId=1 | max_fail_time=300msec<br>maintenance_time="3:00--5:00" | ⇦ PACKET LINK 56 |
| PSC | 203 | 10.0.1.4 | 203 | enabled | LSC,<br>extId=10.0.1.3<br>dst=10.0.1.4,<br>tunnelId=2 | max_fail_time=30sec | ⇦ PACKET LINK 57 |
| LSC | 301 | 10.0.1.5 | 302 | enabled | - | max_fail_time=50msec<br>maintenance_time="22:00--0:00" | ⇦ WAVELENGTH LINK 61 |
| LSC | 302 | 10.0.1.4 | 302 | enabled | - | max_fail_time=50msec<br>maintenance_time="3:00--5:00" | ⇦ WAVELENGTH LINK 63 |
| LSC | 303 | 10.0.1.4 | 303 | enabled | - | max_fail_time=30sec<br>maintenance_time="0:00--3:00" | ⇦ WAVELENGTH LINK 64 |

| SESSION IDENTIFIER | PREVIOUS HOP | NEXT HOP | SERVICE IDENTIFIER | SERVICE ATTRIBUTE | EXPLICIT ROUTE OBJECT | OTHER RSVP OBJECT 1 | ... | OTHER RSVP OBJECT n | ADAPTATION SPECIFICATIONS |
|---|---|---|---|---|---|---|---|---|---|
| 13011 | 13012 | 13013 | 13014 | 13015 | 13016 | 13017 | | 13018 | 1302 |
| | | | RSVP INFORMATION 1301 | | | | | | |
| dst=10.0.1.2, tunnelId=1, extId=10.0.1.1 | IPv4Addr= 10.0.1.1, IF_ID=103 | IPv4Addr= 10.0.4.., IF_ID=101 | Enterprise_ data | max_fail_time=30sec, acceptable_down_hour= {22:00–3:00} | {10.0.1.3, 101, S}, {10.0.1.4, 103, S}, {10.0.1.2, L}, | – | ... | – | notifyFailureDetection =enabled |
| dst=10.0.1.2, tunnelId=1, extId=10.0.1.1 | IPv4Addr= 10.0.1.1, IF_ID=103 | IPv4Addr= 10.0.1.4, IF_ID=101 | Enterprise_ data | max_fail_time=30sec, acceptable_down_hour= {0:00–5:00} | {10.0.1.3, 101, S}, {10.0.1.4, 105, S}, {10.0.1.2, L}, | – | ... | – | |
| dst=10.0.1.2, tunnelId=1, extId=10.0.1.1 | IPv4Addr= 10.0.1.1, IF_ID=104 | IPv4Addr= 10.0.1.4, IF_ID=102 | TV_ Broadcast | max_fail_time=1sec, acceptable_down_hour= {3:00–5:00} | {10.0.1.3, 102, S}, {10.0.1.4, 104, S}, {10.0.1.2, L}, | – | ... | – | |

⇐ PSC-LSP 31
⇐ PSC-LSP 32
⇐ PSC-LSP 33

FIG. 14

| SWITCHING CAPABILITY 1401 | OPERATIONAL STATE 1402 | LINK TERMINATION POINT A 1403 | | LINK TERMINATION POINT B 1404 | |
|---|---|---|---|---|---|
| | | ROUTER IDENTIFIER A 14031 | INTERFACE IDENTIFIER A 14032 | ROUTER IDENTIFIER B 14041 | INTERFACE IDENTIFIER B 14042 |
| PSC | enabled | 10.0.1.1 | 103 | 10.20.1.3 | 101 |
| PSC | enabled | 10.0.1.1 | 104 | 10.20.1.3 | 102 |
| PSC | enabled | 10.0.1.2 | 103 | 10.20.1.4 | 101 |
| PSC | disabled | 10.0.1.2 | 104 | 10.20.1.4 | 102 |
| PSC | enabled | 10.0.1.3 | 201 | 10.20.1.4 | 201 |
| PSC | enabled | 10.0.1.3 | 202 | 10.20.1.4 | 202 |
| PSC | enabled | 10.0.1.3 | 203 | 10.20.1.4 | 203 |
| LSC | enabled | 10.0.1.4 | 301 | 10.0.1.5 | 301 |
| LSC | enabled | 10.0.1.3 | 301 | 10.0.1.5 | 302 |
| LSC | enabled | 10.0.1.3 | 302 | 10.0.1.4 | 302 |
| LSC | enabled | 10.0.1.3 | 303 | 10.0.1.4 | 303 |

8018

COMMUNICATION NETWORK SYSTEM THAT ESTABLISHES COMMUNICATION PATH BY TRANSFERRING CONTROL SIGNAL

CLAIM OF PRIORITY

The present application claims priority from Japanese application JP 2007-090213 filed on Mar. 30, 2007, the content of which is hereby incorporated by reference into this application.

FIELD OF THE INVENTION

The present invention relates to a communication path establishment control system for a communication network in which a communication path is established.

Particularly, the present invention relates to a communication path establishment control system for establishing, in a communication network where there are multiple management domains or multiple management-target layers, a communication path over the management domains or the layers.

BACKGROUND OF THE INVENTION

Technologies of dynamically setting a communication path in a communication network include MPLS ("Multiprotocol Label Switching Architecture" E. Rosen and others, RFC3031, IETF) and GMPLS ("Generalized Multi-Protocol Label Switching Architecture" Eric Mannie and others, RFC3945, IETF). Those technologies set a label switched path (LSP) which is a virtual communication path by using a signaling protocol of, for example, GMPLS RSVP-TE ("Generalized Multi-Protocol Label Switching (GMPLS) Signaling Resource ReserVation Protocol-Traffic Engineering (RSVP-TE) Extensions" L. Berger and others, RFC3473, IETF), in a communication network configured by network devices such as wavelength switches, time-division multiplexers, and packet switches.

As technologies for establishing, when a GMPLS network is configured by multiple layers or multiple management domains, a communication path over the layers or the management domains by signaling, a technique described in JP-A No. 2005-252385 and a technique described in "Preserving Topology Confidentiality in Inter-Domain Path Computation and Signaling", R. Bradford and others, IETF Internet draft, draft-bradford-pce-path-key-00.txt, Jun. 16, 2006, are known.

According to the technique described in JP-A No. 2005-252385, when a communication path is established by RSVP-TE, a link (that is, a lower-layer communication path) used by each communication path can be determined for each service provided with the use of the communication path. Specifically, a service identifier is assigned in advance to the lower-layer communication path, and an edge node located in the upper layer issues a communication path establishment request which contains the service identifier. A node located at the boundary between the layers selects, from selectable links, a link whose service identifier matches the service identifier contained in the received communication path establishment request.

According to the technique described in "Preserving Topology Confidentiality in Inter-Domain Path Computation and Signaling", there is provided means for determining, when a communication path is established by GMPLS between a node in a first management domain (hereinafter, referred to as domain 1) and a node in a second management domain (hereinafter, referred to as domain 2), a route of the communication path through cooperation processing performed by managers which are called path computation elements (PCEs) for managing the respective domains.

Specifically, when a source node requests the PCE (hereinafter, referred to as PCE 1) of the domain 1 to calculate the route, the PCE 1 calculates the route of the communication path for a leg (hereinafter, referred to as leg 1) in the domain 1, and then requests the PCE (hereinafter, referred to as PCE 2) of the domain 2 to calculate the route of the communication path for a leg (hereinafter, referred to as leg 2) in the domain 2. The PCE 2 returns key information (path key) corresponding to the calculation result of the leg 2. The PCE 1 returns the route of the leg 1 and the path key of the leg 2 to the source node.

The source node issues a communication path establishment request which contains the route of the leg 1 and the path key of the leg 2. A node located at the boundary between the domain 1 and the domain 2 inquires the PCE 2 by using the received path key to obtain the route of the leg 2 and establish the communication path in the leg 2.

SUMMARY OF THE INVENTION

To establish a communication path, links used by the communication path for hops can be automatically determined with a required maintenance condition for the communication path and an achievable maintenance condition for each network resource taken into account, without causing a network designer to make a decision each time. Further, it is possible to automatically configure adaptations (various functions to combine each other) for connecting communication paths which are different depending on their service types and required maintenance conditions, over layers or management domains.

The achievable maintenance condition for a network resource is an attribute related to the maintenance of the network resource, such as a data switch, a network interface, or a link for each hop, which is used by the communication path. The required maintenance condition includes a period of time required for planned work, a period of time required for replacement at a failure, the presence or absence of a component to be periodically replaced, a person in charge of the maintenance, a vendor, the presence or absence of a spare component, mean time between failures (MTBF), mean time to repair (MTTR), the number of an article, the version number of an article, the presence or absence of a failure determination test function, the presence or absence of purchase of a liability insurance, and the presence or absence of a free replacement guarantee.

The required maintenance condition for the communication path should be satisfied by network resources used by the communication path, which provides a service, and is expressed by a constraint condition expression for the attribute related to the maintenance.

According to the technique described in JP-A No. 2005-252385, it is possible to control the lower-layer communication path used by the communication path in a certain layer, for each service identifier. However, since the control is performed by comparing service identifiers, when the same services are provided, the services may be accommodated in the same lower-layer communication path even when required maintenance conditions are different. For example, a service for financial institutions, for which service suspension is not acceptable during daytime, and a TV broadcast access line, for which service suspension is not acceptable from early evening to late evening, can be accommodated in the same lower-layer communication path if they are the same service, "100 Mbps broadband LAN service". Therefore, time for a maintenance work such as renewal of equipment in the lower layer is limited.

Further, the technique described in JP-A No. 2005-252385 does not specify a method of controlling adaptations. The adaptations are of great variety like the required maintenance condition, and it is conceivable that a similar problem occurs.

A main object of the technique described in "Preserving Topology Confidentiality in Inter-Domain Path Computation and Signaling" is that the domain 1 and the domain 2 hide their topologies, and does not have a direct association with the problems to be solved by the present invention. However, when this technique is combined with the technique described in JP-A No. 2005-252385 and the PCE 2 is configured to further determine adaptations, the size of data sent by GMPLS signaling can be reduced. In that case, however, the control sequence becomes complicated.

The present invention has an object to appropriately and automatically select a link used by a communication path for each hop and adaptations used at the boundary between management domains or layers, according to a service type and a required maintenance condition, without making a control sequence complicated.

In the present invention, first, a unit for requesting path establishment by including an identifier of a service to be provided and a service attribute in a communication path establishment control message is provided for a source node.

Secondly, a unit for determining a required maintenance condition for a communication path and adaptations according to the service identifier and/or the service attribute is provided for each node. When the communication path establishment control message is received, the node checks the service identifier and the service attribute, which are included in the received communication path establishment control message, and determines a required maintenance condition for the communication path and adaptations, by using the unit for determining a required maintenance condition for a communication path and adaptations.

Thirdly, a unit for holding achievable maintenance conditions for network resources such as nodes and links between the nodes is provided for each node. By comparing each of the achievable maintenance conditions for the network resources with the required maintenance condition for the communication path, links and nodes that satisfy the required maintenance condition are determined. The determined links, nodes, adaptations are specified as operation parameters in switches and/or interfaces.

According to the present invention, information on the service type and the service attribute can be exchanged between the layers or the management domains, for each communication path when the communication path is requested to be established. Therefore, it is possible to determine an accommodation relationship and adaptations by specifying the achievable maintenance condition according to the service type and the service attribute, without exchanging in advance control information between the layers or the management domains.

BRIEF DESCRIPTION OF THE DRAWINGS

FIG. 2 is a list of interface identifiers of interface parts of GMPLS switches according to the first embodiment;
FIG. 3 is a list of link identifiers of links between the GMPLS switches according to the first embodiment;
FIG. 8C is a diagram specifically showing the content of a path request message issued by the packet switching equipment A 11 to establish a PSC-LSP 32;
FIG. 8D is a diagram specifically showing the content of a path request message issued by the packet switching equipment A 11 to establish a PSC-LSP 33;
FIG. 11 is a diagram showing the structure of a service definition table 8011 according to the first embodiment;
FIG. 12 is a diagram showing the structure of a link attribute definition table 8010 according to the first embodiment;
FIG. 13 is a diagram showing the structure of a session management table 8020 according to the first embodiment;
FIG. 14 is a diagram showing the structure of a network topology table 8018 according to the first embodiment.

DETAILED DESCRIPTION OF THE PREFERRED EMBODIMENT

First Embodiment

Hereinafter, a first embodiment of the present invention will be described.

In the first embodiment, a description will be given to a case where GMPLS extended RSVP-TE is used as a signaling protocol and GMPLS extended OSPF-TE is used as a link state routing protocol. However, this embodiment can be similarly applied to a case using other protocols such as IS-IS ("OSI IS-IS intra-domain routing protocol", IETF RFC1142) and GMPLS CR-LDP (IETF RFC3472, "generalized multi-protocol label switching (GMPLS) signaling constraint-based routed label distribution protocol (CR-LDP) extensions").

Figure 1:
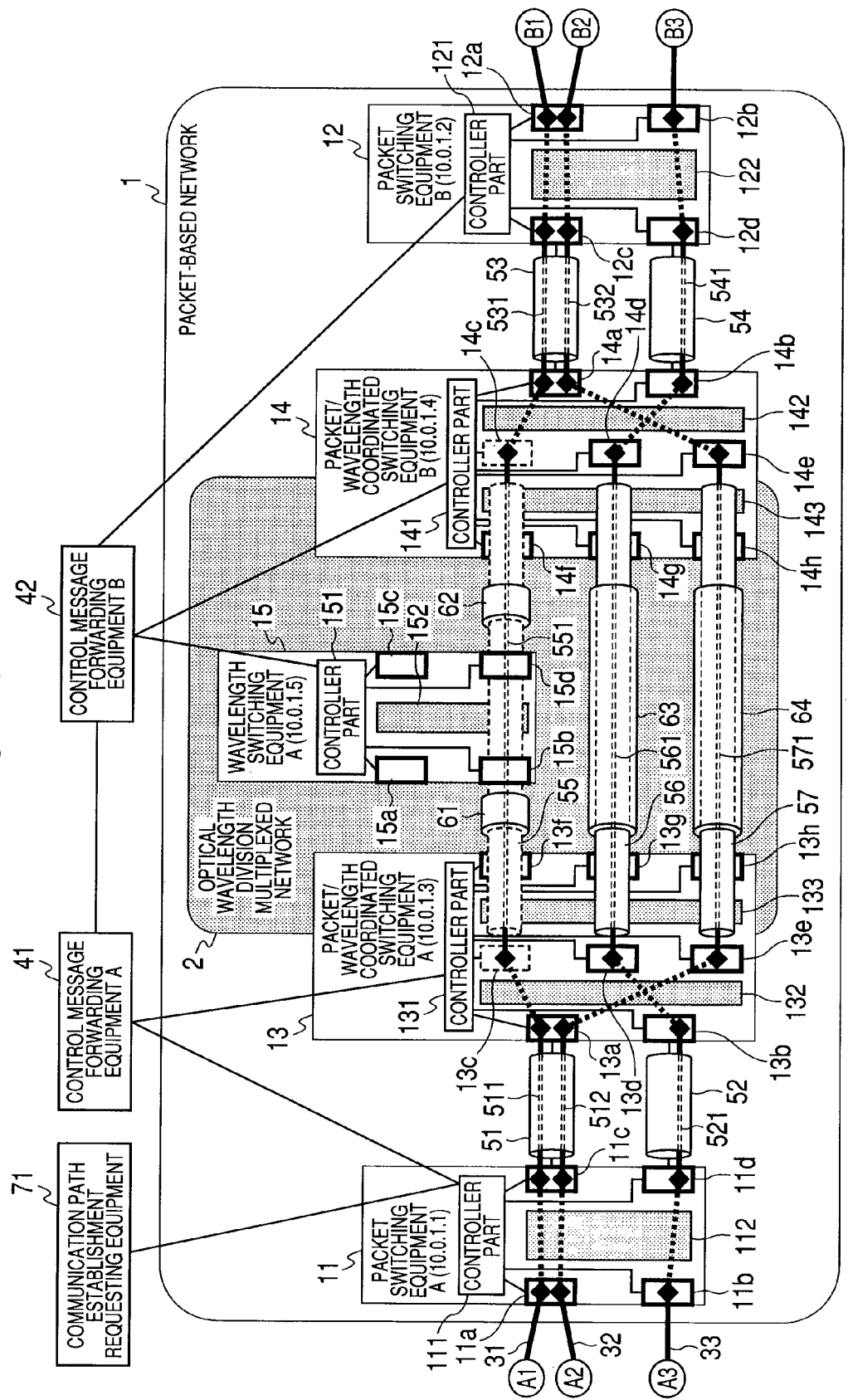
FIG. 1 is a block diagram of a network system according to a first embodiment of the present invention.

FIG. 1 is a block diagram of a network system according to the first embodiment of the present invention.

The network system according to the first embodiment is a GMPLS network where GMPLS extended RSVP-TE messages and GMPLS extended OSPF-TE messages are sent and received in a link different from a communication path 61 is to be established.

The network system of the first embodiment includes a packet-based network 1 and/or an optical wavelength division multiplexed network 2.

The packet-based network 1 and the optical wavelength division multiplexed network 2 each include one or more GMPLS switches. They also include links for exchanging user data between the GMPLS switches, and control message forwarding equipment A 41 and B 42 for transferring control information to the GMPLS switches.

In the packet-based network 1, specifically, the GMPLS switches are packet switching equipment A 11 and B 12 and/or packet/wavelength coordinated switching equipment A 13 and B 14, and the links are packet links 51 to 54.

In the optical wavelength division multiplexed network 2, specifically, the GMPLS switches are the packet/wavelength coordinated switching equipment A 13 and B 14 and/or wavelength switching equipment A 15, and the links are wavelength links 61 to 64.

Each GMPLS switch includes one or more interface parts for exchanging user data, one or more switch parts for controlling the transfer destination of the user data, and a controller part for controlling the interface parts and the switch parts.

In the packet switching equipment A 11 and B 12, the interface parts are specifically packet interface parts which terminate the packet links. Similarly, the switch parts are packet switch parts.

In the wavelength switching equipment A 15, the interface parts are specifically wavelength interface parts which terminate the wavelength links. Similarly, the switch parts are wavelength switch parts.

In the packet/wavelength coordinated switching equipment A 13 and B 14, the interface parts are specifically packet interface parts which terminate the packet links and wavelength interface parts which terminate the wavelength links. Similarly, the switch parts are packet switch parts and wavelength switch parts.

Each packet interface part exchanges packet-multiplexed user data with a packet interface part of the adjacent packet switching equipment or the adjacent packet/wavelength coordinated switching equipment, through a corresponding packet link.

Each wavelength interface part exchanges wavelength-multiplexed user data with a wavelength interface part of the adjacent wavelength switching equipment or the adjacent packet/wavelength coordinated switching equipment, through a corresponding wavelength link.

When the network system of this embodiment is configured by multiple layers, in other words, by both the packet-based network 1 and the optical wavelength division multiplexed network 2, the packet-based network 1 further includes at least one packet link, in this case, packet links (LSC-LSPs) 55 to 57.

The packet-based network 1 and the optical wavelength division multiplexed network 2 are controlled according to GMPLS, and user data is sent through established PSC-LSPs 31, 32, and 33.

The PSC-LSP 33 established between A3 and B3 in the packet-based network 1 travels through packet interface parts 11b and 11d of the packet switching equipment A 11, the packet link 52, a packet interface part 13b and a packet/wavelength coordinated interface part 13d of the packet/wavelength coordinated switching equipment A 13, the packet link (LSC-LSP) 56, a packet/wavelength coordinated interface part 14d and a packet interface part 14b of the packet/wavelength coordinated switching equipment B 14, the packet link 54, and packet interface parts 12d and 12b of the packet switching equipment B 12. The PSC-LSP 33 is configured by using bandwidth resources divided by packet multiplexing.

The packet link (LSC-LSP) 56, which constitutes a part of the PSC-LSP 33, travels through a wavelength interface part 13g, the wavelength link 63, and a wavelength interface part 14g, which are located in the lower layer, and is configured by using bandwidth resources (in other words, individual optical wavelengths) divided by wavelength multiplexing.

Similarly, the PSC-LSP 32 travels through packet interface parts 11a and 11c of the packet switching equipment A 11, the packet link 51, a packet interface part 13a and a packet/wavelength coordinated interface part 13e of the packet/wavelength coordinated switching equipment A 13, the packet link (LSC-LSP) 57, a packet/wavelength coordinated interface part 14e and a packet interface part 14a of the packet/wavelength coordinated switching equipment B 14, the packet link 53, and packet interface parts 12c and 12a of the packet switching equipment B 12. The PSC-LSP 32 is configured by using bandwidth resources divided by packet multiplexing.

The packet link (LSC-LSP) 57 constitutes a part of the PSC-LSP 32 travels through a wavelength interface part 13h, the wavelength link 64, and a wavelength interface part 14h, which are located in the lower layer, and is configured by using bandwidth resources (in other words, individual optical wavelengths) divided by wavelength multiplexing.

The PSC-LSP 31 is similarly established. However, before the PSC-LSP 31 is established, the packet link (LSC-LSP) 55 is not established, and the operational state of a packet/wavelength coordinated interface part 13c of the packet/wavelength coordinated switching equipment A 13 and the operational state of a packet/wavelength coordinated interface part 14c of the packet/wavelength coordinated switching equipment B 14 are set to a disabled state. Therefore, in FIG. 1, the packet/wavelength coordinated interface part 13c and the packet/wavelength coordinated interface part 14c are indicated by dotted lines.

The packet link (LSC-LSP) 55 travels through a wavelength interface part 13f of the packet/wavelength coordinated switching equipment A 13, the wavelength link 61, wavelength interface parts 15b and 15d of the wavelength switching equipment A 15, the wavelength link 62, and a wavelength interface part 14f of the packet/wavelength coordinated switching equipment B 14, which are located in the lower layer, and is configured by using bandwidth resources (in other words, individual optical wavelengths) divided by wavelength multiplexing.

Each interface part is identified by an interface identifier in the corresponding GMPLS switch. In the packet-based network 1 and the optical wavelength division multiplexed network 2, each interface part is uniquely identified by a combination of a router identifier and an interface identifier. FIG. 2 shows the interface identifiers of the interface parts shown in FIG. 1. For example, the interface identifier of the packet interface part 11a is 101. Since the router identifier of the packet switching equipment A 11, which includes the packet interface part 11a, is 10.0.1.1, the packet interface part 11a is uniquely identified by a combination of [10.0.1.1, 101] in the packet-based network 1 and the optical wavelength division multiplexed network 2.

Each link is uniquely identified by a link identifier in the network system. The link identifier is a combination of router identifiers and interface identifiers of the interface parts connected by the link. FIG. 3 shows the link identifiers of the links shown in FIG. 1. For example, since the packet link 51 connects the interface parts identified by [10.0.1.1, 103] and [10.20.1.3, 103], the link identifier of the packet link 51 is [10.0.1.1, 103, 10.20.1.3, 103].

Communication path establishment requesting equipment 71 is, for example, an operation terminal, a network management system of an element management system, or an application system such as a storage management server or a video server, and requests to establish the PSC-LSPs 31 to 33. Although FIG. 1 shows only one piece of the communication path establishment requesting equipment 71, a desired number of pieces of the communication path establishment requesting equipment 71 may be provided corresponding to the number of termination points of the communication paths to be established.

As a protocol used by the communication path establishment requesting equipment 71 to request the packet-based network 1 to establish PSC-LSPs, command inputs using telnet (IETF RFC854), a signaling protocol such as RSVP-TE or O-UNI (optical internetworking forum, user network interface (UNI) 1.0 signaling specification), an application protocol such as HTTP (IETF RFC1945), SIP (IETF RFC2543), or RTSP (IETF RFC2326), or a remote procedure call protocol such as SOAP (world wide web consortium, SOAP version 1.2) or IIOP (object management group, CORBA™/IIOP™ specification) can be used.

When the communication path establishment requesting equipment 71 requests to establish PSC-LSPs, the packet switching equipment A 11, the packet/wavelength coordinated switching equipment A 13, the packet/wavelength coordinated switching equipment B 14, and the packet switching equipment B 12 exchange signaling protocol (for example, GMPLS extended RSVP-TE) messages with one another and update the states of the packet switch parts in the respective switches, thereby establishing the PSC-LSPs 31 to 33. When the packet links (LSC-LSPs) 55 to 57, which should be established prior to the PSC-LSPs 31 to 33, have not been established yet, the packet/wavelength coordinated switching equipment A 13, the wavelength switching equipment A 15, and the packet/wavelength coordinated switching equipment B 14 exchange, when needed, signaling protocol messages with one another and update the states of the wavelength switch parts 133, 153, and 143 in the respective switches, thereby establishing the packet links (LSC-LSPs) 55 to 57.

The packet switching equipment A 11 and B 12, the packet/wavelength coordinated switching equipment A 13 and B 14, and the wavelength switching equipment A 15 can obtain a network topology by sending and receiving messages of GMPLS extended OSPF-TE, which is one of routing protocols. The GMPLS extended OSPF-TE messages are sent and received via the control message forwarding equipment A 41 and/or the control message forwarding equipment B 42.

In GMPLS, user data and the signaling protocol do not need to be transferred through the same path. In this embodiment, for example, user data to be sent through the PSC-LSP 33 is transferred via the packet switching equipment A 11, the packet/wavelength coordinated switching equipment A 13 and B 14, and the packet switching equipment B 12 (via communication interfaces 11b, 11d, 13b, 13d, 14d, 14b, 12d, and 12b), whereas GMPLS extended RSVP-TE messages and GMPLS extended OSPF-TE messages are transferred via the control message forwarding equipment A 41 and/or the control message forwarding equipment B 42.

The GMPLS extended RSVP-TE messages and the GMPLS extended OSPF-TE messages may be encapsulated by a tunneling protocol such as a generic routing encapsulation (IETF RFC2784).

The control message forwarding equipment A 41 and the control message forwarding equipment B 42 have a packet transfer function such as an Internet protocol (IP) router or an IEEE 802.3D MAC bridge.

Next, the hardware configuration and the operation of each GMPLS switch will be described.

Figure 4:
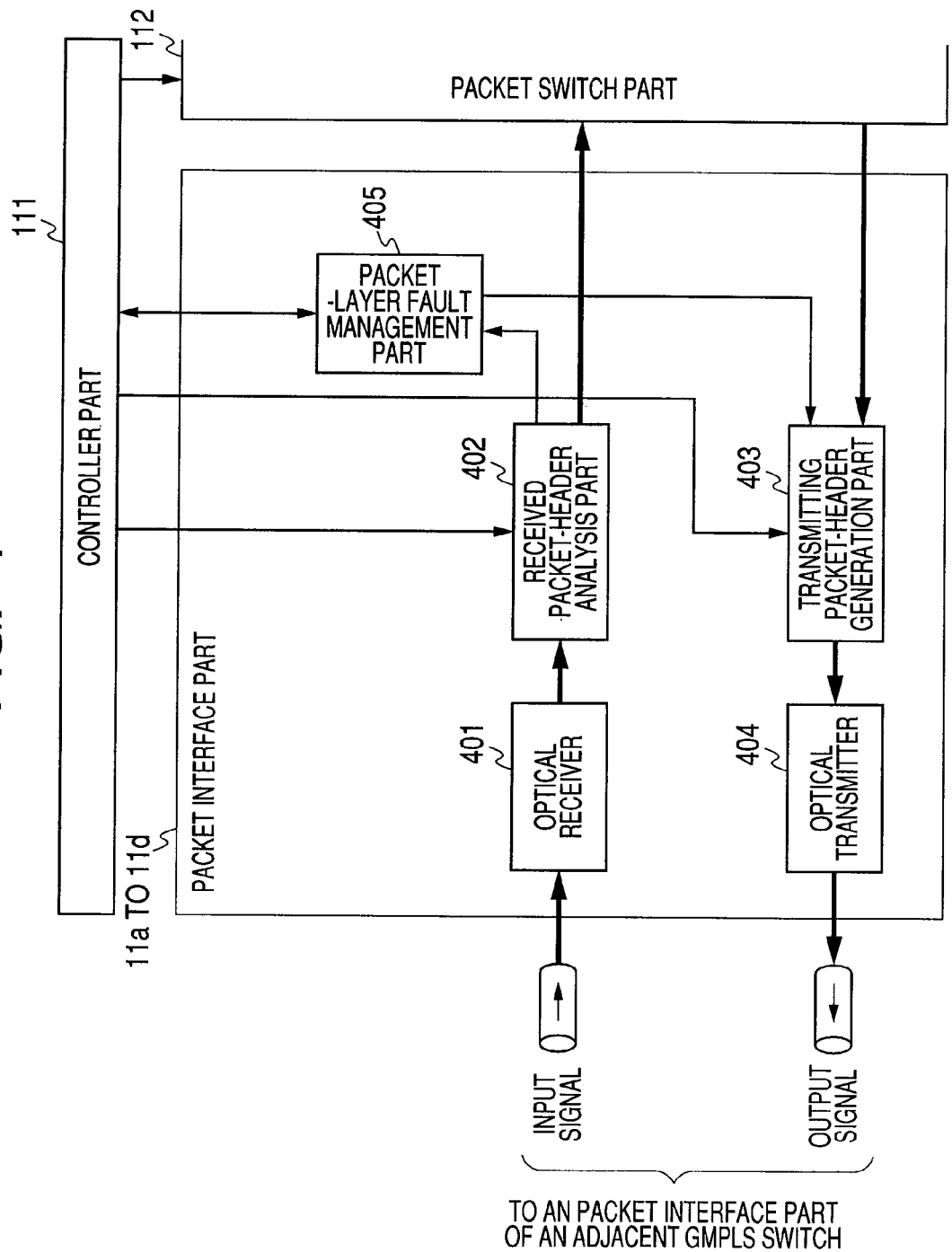
FIG. 4 is a block diagram of packet interface parts according to the first embodiment.

FIG. 4 is a block diagram of the packet interface parts 11a to 11d. Each of the packet interface parts 11a to 11d includes an optical receiver 401, a received packet-header analysis part 402, a transmitting packet-header generation part 403, an optical transmitter 404, and a packet-layer fault management part 405.

The optical receiver 401 receives an optical signal from another GMPLS switch, decodes the optical signal to obtain packet data, and sends the packet data to the received packet-header analysis part 402. The received packet-header analysis part 402 uses header information of the received packet to generate internal transfer-destination information which can be understood by a packet switch part 112, and sends it to the packet switch part 112.

The packet switch part 112 determines an interface part to which the packet is to be sent, based on packet cross connect information determined by exchanging a GMPLS extended RSVP-TE message, and transfers the packet to the determined interface part.

A packet to be transferred is passed from the packet switch part 112 to the transmitting packet-header generation part 403. The transmitting packet-header generation part 403 generates header information necessary to transfer the packet to the next hop and sends the packet as an optical signal to the packet interface part of an adjacent GMPLS switch via the optical transmitter 404.

The packet-layer fault management part 405 determines whether a fault has occurred in the packet layer, in response to an instruction of the controller part 111, and notifies information indicating whether a fault has occurred, to the controller part 111. Whether a fault has occurred is determined for each established PSC-LSP, for each packet link, or for each signal in the lower layer.

To determine whether a fault has occurred, a passive check method performed by checking an optical signal for power loss and frame out of synchronization or through cyclic redundancy check (CRC), or an active check method performed by exchanging a fault detect signal of Ethernet-OAM (ITU-T Y.1731, IEEE802.1ag), MPLS-OAM (ITU-T, Y.1711), or ICMP (IETF, RFC0792) can be used.

The received packet-header analysis part 402 and the transmitting packet-header generation part 403 may also perform adaptation processing between the networks, such as packet encapsulation processing, traffic-flow division/aggregation processing, QoS mapping processing, alarm transfer processing, and code conversion processing. The adaptation processing is also controlled according to an instruction of the controller part 111.

As the packet encapsulation processing, MPLS label stack encoding (IETF, RFC3032), pseudo wire emulation (PWE3; IETF, RFC3985) or generic framing procedure (GFP; ITU-T, G.7041) can be performed.

As the QoS processing, mapping of DSCP values of DiffServ ("differentiated services and tunnels", IETF, RFC2983) and priority values of IEEE 802.1D, determination of DSCP values based on the amount of traffic according to TrTCM ("a two rate three color marker", IETF, RFC2698), selective packet discarding based on L2 to L7 header information, or selective packet discarding based on reverse path forwarding (uRPF) can be performed.

As the traffic-flow division/aggregation processing, an optical transport network (OTN)/synchronous digital hierarchy (SDH)/MPLS transmission path protection function, virtual concatenation (VCAT; ITU-T, G.783), link capacity adjustment scheme (LCAS; ITU-T, G.7042), link aggregation, or policy routing based on L2 to L7 header information can be performed.

In the alarm transfer processing, new Ethernet-OAM fault information can be issued when a fault alarm is detected by MPLS-OAM.

As the code conversion processing, insertion of error correcting code, protocol conversion, data compression and decompression, or media stream transcoding can be performed.

The configurations and operations of the packet interface parts of the packet switching equipment B 12 and the packet/wavelength coordinated switching equipment A 13 and B 14 are the same as those of the packet interface parts 11*a* to 11*d*.

Figure 5:
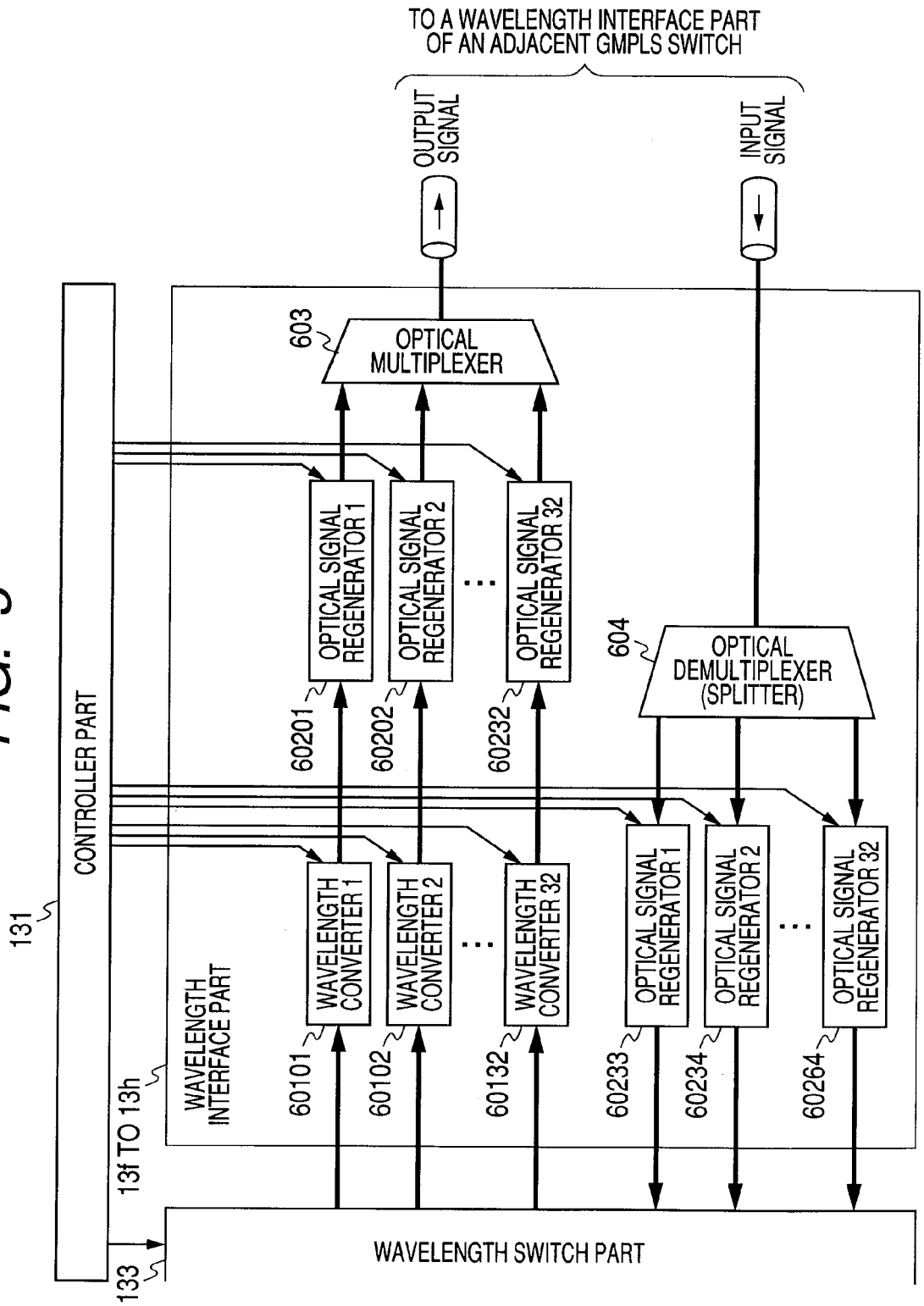
FIG. 5 is a block diagram of wavelength interface parts according to the first embodiment.

FIG. 5 is a block diagram showing the configuration and the operation of each of wavelength interface parts 13*f* to 13*h* of the packet/wavelength coordinated switching equipment A 13.

Each of the wavelength interface parts 13*f* to 13*h* includes wavelength converters 60101 to 60132, optical signal regenerators 60201 to 60232, an optical multiplexer 603, an optical demultiplexer (splitter) 604, and optical signal regenerators 60233 to 60264.

The optical demultiplexer 604 divides a wavelength-multiplexed optical signal received from a wavelength interface part of the adjacent wavelength switching equipment or the adjacent packet/wavelength coordinated switching equipment into individual wavelength components and passes the wavelength components to the optical signal regenerators 60233 to 60264. The optical signal regenerators 60233 to 60264 regenerate optical signals by a 2R (re-amplification and re-shaping) or 3R (re-amplification, re-shaping, and re-timing) process and pass the optical signals to the wavelength switch part 133.

The wavelength switch part 133 determines interface parts to which the optical signals are to be sent, based on optical cross connect information determined by exchanging a GMPLS extended RSVP-TE message, and transfers the optical signals to the determined interface parts.

Figure 6:
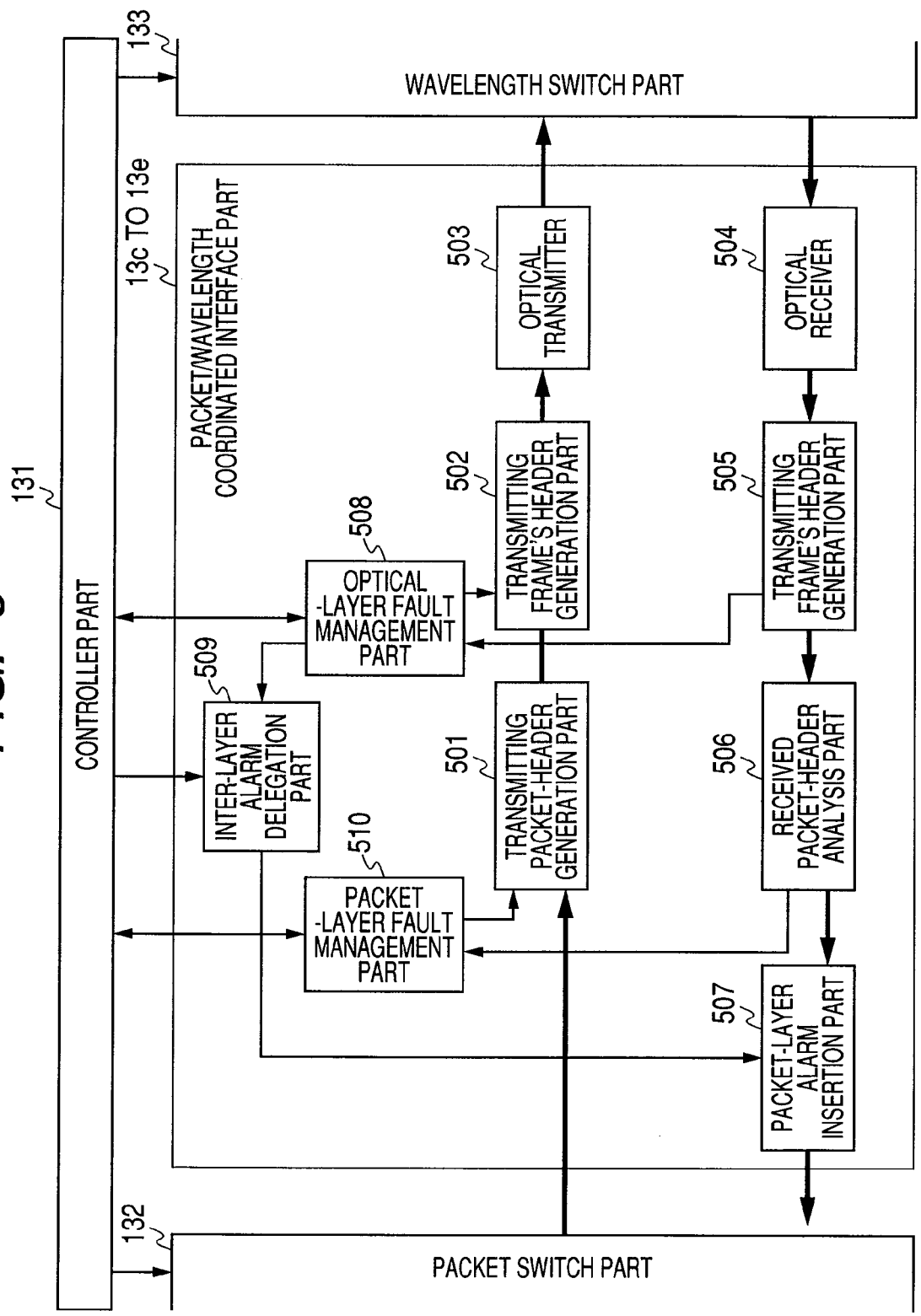
FIG. 6 is a block diagram of packet/wavelength coordinated interface parts according to the first embodiment.

FIG. 6 is a block diagram showing the configuration and the operation of each of the packet/wavelength coordinated interface parts 13*c* to 13*e* of the packet/wavelength coordinated switching equipment A 13.

Each of the packet/wavelength coordinated interface parts 13*c* to 13*e* includes a transmitting packet-header generation part 501, a transmitting frame's header generation part 502, an optical transmitter 503, an optical receiver 504, a transmitting frame's header generation part 505, a received packet-header analysis part 506, a packet-layer alarm insertion part 507, an optical-layer fault management part 508, an inter-layer alarm delegation part 509, and a packet-layer fault management part 510.

Next, the configuration and the operation of the controller part 111 of the packet switching equipment A 11 will be described.

Figure 7:
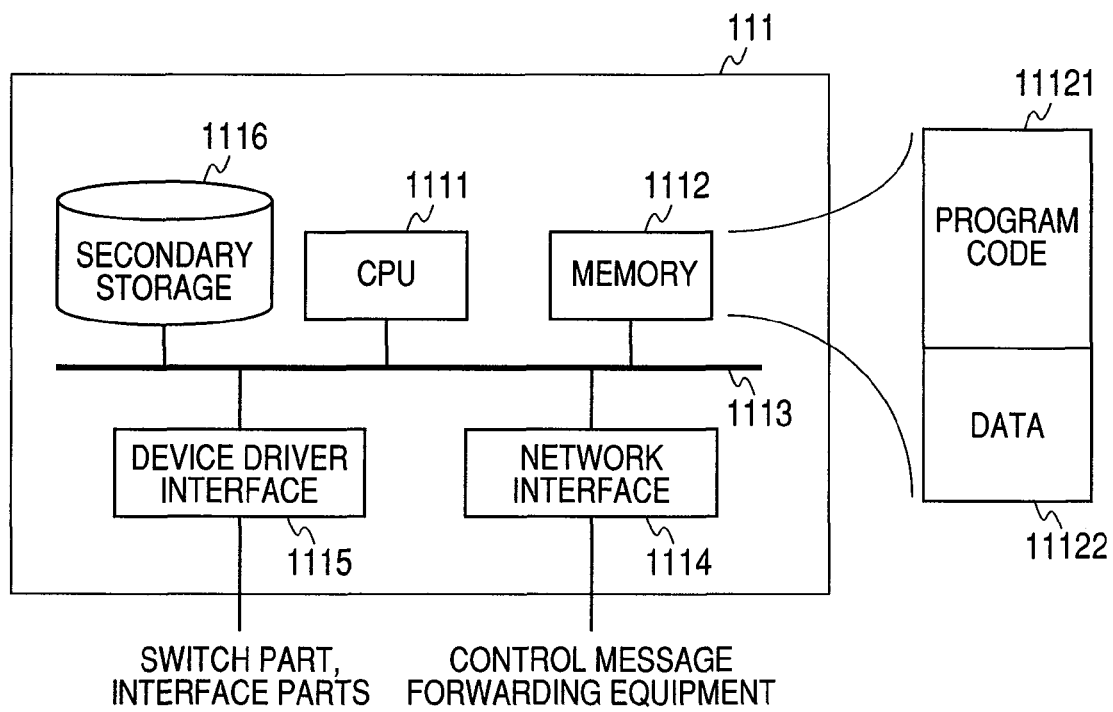
FIG. 7 is a block diagram of a controller part of packet switching equipment according to the first embodiment.

FIG. 7 is a block diagram of the controller part 111 of the packet switching equipment A 11.

The controller part 111 includes a central processing unit 1111, a memory 1112, an internal channel 1113 such as a bus, a network interface 1114, a device driver interface 1115, and a secondary storage 1116.

The network interface 1114 is connected to the control message forwarding equipment and exchanges GMPLS extended RSVP-TE messages with the other GMPLS switches.

The device driver interface 1115 is connected to the packet switch part and the packet interface parts and controls them.

In the memory 1112, program code 11121 and data 11122 are stored as needed.

A controller part 121 of the packet switching equipment B 12 has the same configuration as the controller part 111.

A controller part 151 of the wavelength switching equipment A 15 also has the same configuration as the controller part 111. However, in the wavelength switching equipment A 15, the controller part 151 is connected to the wavelength interface parts and the wavelength switch part.

Controller parts 131 and 141 of the packet/wavelength coordinated switching equipment A 13 and B 14 also have the same configuration as the controller part 111. However, in packet/wavelength coordinated switching equipment A 13 and B 14, the controller parts 131 and 141 are each connected to the corresponding packet interface parts, the corresponding wavelength interface parts, the corresponding packet switch part, and the corresponding wavelength switch part.

Figure 8A:
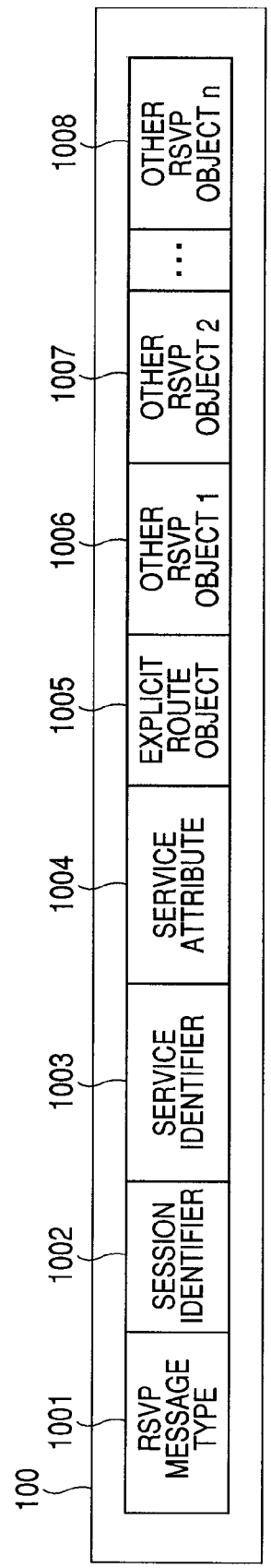
FIG. 8A is a format diagram showing the content of a GMPLS extended RSVP-TE message 100 to be exchanged between the GMPLS switches according to the first embodiment.

FIG. 8A is a format diagram showing the content of a GMPLS extended RSVP-TE message 100 to be exchanged between the GMPLS switches.

The GMPLS extended RSVP-TE message 100 contains an RSVP message type 1001, a session identifier 1002, a service identifier 1003, a service attribute 1004, an explicit route object 1005, other RSVP objects 1_1006, 2_1007, and n_1008.

The RSVP message type 1001, the session identifier 1002, and the explicit route object 1005 are objects according to the RSVP standard.

The GMPLS extended RSVP-TE message 100 is either a PATH message which indicates a path establishment request or an RESV message which indicates path establishment acknowledgement and resource allocation. The RSVP message type 1001 specifies one of those message types.

The session identifier 1002 identifies a communication path (label switched path (LSP)) established by GMPLS.

The explicit route object 1005 is used by an upstream GMPLS switch to specify a point through which the communication path to be established should pass.

The service identifier 1003 and the service attribute 1004 are objects introduced in this specification. The service identifier 1003 indicates the type of a service provided by the path to be established. The service attribute 1004 indicates attributes unique to individual service items that characterize details of the service.

The other RSVP object 1_1006, the other RSVP object 2_1007, and the other RSVP object n_1008 are objects other than the above-mentioned objects, according to the RSVP standard.

Figure 8B:
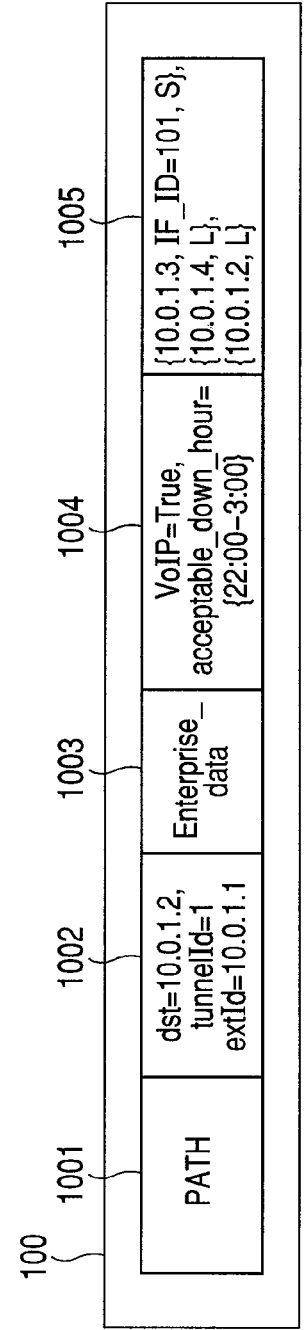
FIG. 8B is a diagram specifically showing the content of a path request message issued by packet switching equipment A 11 to establish a PSC-LSP 31.

FIG. 8B shows a path request message issued from the packet switching equipment A 11 to the packet/wavelength coordinated switching equipment A 13, to establish the PSC-LSP 31.

Since this path request message is a path establishment request, the RSVP message type 1001 is set to PATH. Since the router identifiers of the source node and the destination node are 10.0.1.2 and extId=10.0.1.1, the session identifier 1002 is set to "10.0.1.2, tunneled=1, extId=10.0.1.1" according to the GMPLS standard.

The service identifier 1003 indicates that the service is provided for a company. The service attribute 1004 indicates that VoIP is used and the line-disconnection acceptable time is 22:00 to 3:00.

The explicit route object 1005 indicates the route through which the path should pass. The values of the route are obtained by a communication path's route computation part 8019 by a route search algorithm such as Shortest Path First, with reference to a network topology table 8018. Since information on a required maintenance condition and adaptations is not stored in the network topology table 8018, details of links cannot be determined from end to end in the PSC-LSP 31. Therefore, the link to the node serving as the next hop, having a router identifier of 10.0.1.3 is explicitly specified, but, for the links to nodes having router identifiers of 10.0.1.4 and 10.0.1.2, only the nodes are specified.

FIG. 8C similarly shows the content of a path request message issued from the packet switching equipment A 11 to the packet/wavelength coordinated switching equipment A 13, to establish the PSC-LSP 32. The path request message indicates that the PSC-LSP 32 is used for a service for a company and VoIP is not used.

FIG. 8D similarly shows the content of a path request message issued from the packet switching equipment A 11 to the packet/wavelength coordinated switching equipment A 13, to establish the PSC-LSP 33. The path request message indicates that the PSC-LSP 33 is used for a TV broadcast service.

Figure 9:
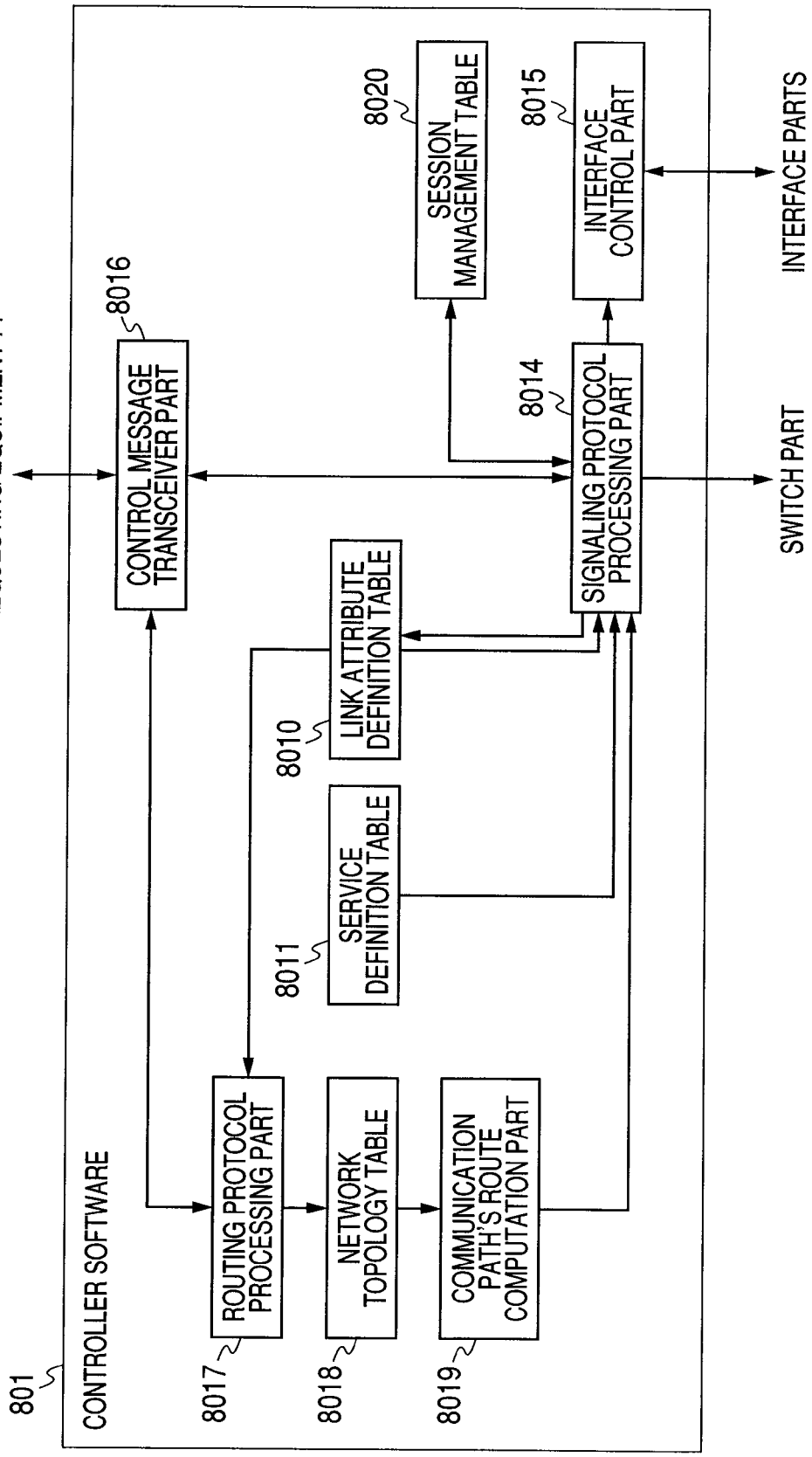
FIG. 9 is a software configuration diagram of the controller part of each GMPLS switch according to the first embodiment.

FIG. 9 is a diagram showing a software configuration of the controller part 111. The other controller parts in the other GMPLS switches also have the same software configuration.

A signaling protocol processing part 8014 exchanges GMPLS extended RSVP-TE messages with the other GMPLS switches via a control message transceiver part 8016, and also receives a path establishment request from the communication path establishment requesting equipment 71.

When the signaling protocol processing part 8014 receives a path establishment request from the communication path establishment requesting equipment 71 or receives a PATH message from an upstream GMPLS switch, a link for the next hop and adaptations are determined based on the service identifier 1003 and the service attribute 1004 by a direction, or degree, decision process and an adaptation decision process, which will be described later with reference to FIG. 15. The determined link for the next hop and adaptations are stored in a session management table 8020. Further, the determined link for the next hop and adaptations are sent to a downstream GMPLS switch via the control message transceiver part 8016 by a PATH message forwarding process according to the GMPLS standard.

When the determined link for the next hop has not been established, the signaling protocol processing part 8014 requests the communication path's route computation part 8019 to calculate the route of the communication path to be established. The signaling protocol processing part 8014 requests, based on the decided route, to establish a new communication path starting at the local node. For example, while the PSC-LSP 31 is being established, the signaling protocol processing part 8014 requests to establish the packet link (LSC-LSP) 55, which has not been established, with the local node serving as the source node.

When an RESV message is received from a downstream GMPLS switch, the signaling protocol processing part 8014 assembles cross connection setting values based on the link information stored in the session management table 8020 and sets the cross connection setting values in the corresponding switch part. Further, the signaling protocol processing part 8014 configures the corresponding interface part based on the adaptation information stored in the session management table 8020.

A routing protocol processing part 8017 sends and receives a GMPLS extended OSPF-TE message to and from the other GMPLS switches via the control message transceiver part 8016.

The routing protocol processing part 8017 sends information on the link with an adjacent GMPLS switch, held by a link attribute definition table 8010 to the adjacent GMPLS switch by GMPLS extended OSPF-TE, and stores this link information in the network topology table 8018. Further, the routing protocol processing part 8017 stores link information received from an adjacent GMPLS switch, in the network topology table 8018, and transfers the link information to the other adjacent GMPLS switch. With those operations, all pieces of link information in the packet-based network 1 and the optical wavelength division multiplexed network 2 are accumulated in the network topology table 8018 to understand the topologies of the packet-based network 1 and the optical wavelength division multiplexed network 2.

In response to the request of the signaling protocol processing part 8014, the communication path's route computation part 8019 calculates the route through which the communication path can be established, based on the topology information accumulated in the network topology table 8018. As a calculation algorithm, Shortest Path First (SPF) is used, for example.

The signaling protocol processing part 8014 also evaluates the service identifier 1003 and the service attribute 1004, which are contained in the received path establishment request, with reference to a service definition table 8011, and determines the required maintenance condition for the communication path to be established and adaptations, through the direction, or degree, decision process and the adaptation decision process, which will be described later with reference to FIG. 15. Further, the signaling protocol processing part 8014 refers to the link attribute definition table 8010 based on the required maintenance condition for the communication path, and determines a link to be used for the next hop.

The signaling protocol processing part 8014 determines for each record whether a condition for the specified service identifier 1101 and a condition for the specified service attributes 1102 are satisfied. When the conditions are satisfied, the signaling protocol processing part 8014 employs the values of a required maintenance condition 1103 and adaptation specifications 1104 in the same record, as an achievable maintenance condition and adaptations.

Figure 10:
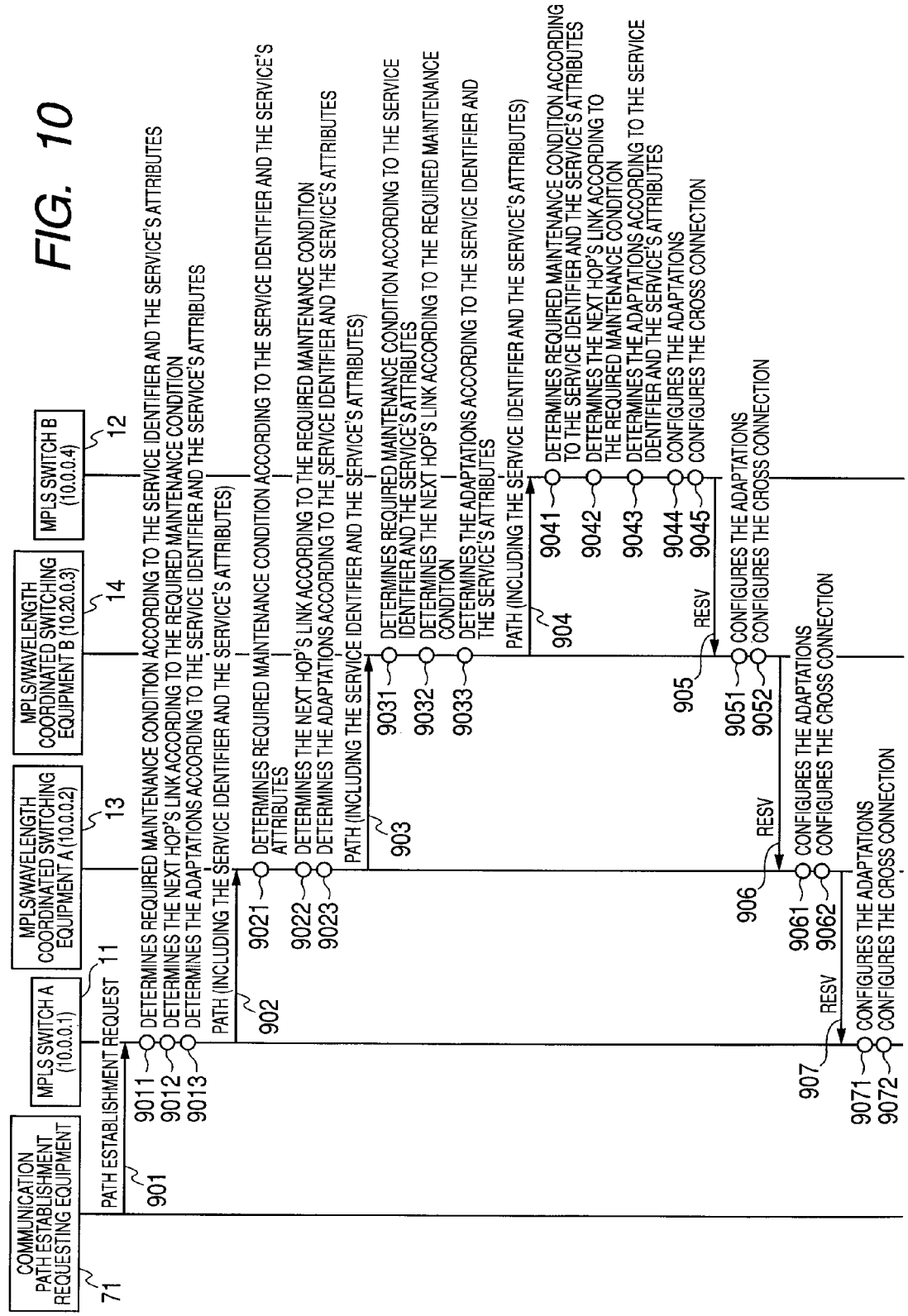
FIG. 10 is a diagram of a sequence followed to establish a communication path, according to the first embodiment.

FIG. 10 is a sequence diagram showing GMPLS extended RSVP-TE messages to be sent and received by the GMPLS switches to establish a communication path and showing a sequence of processing performed by the controller parts of the GMPLS switches.

When the packet switching equipment A 11 receives a path establishment request issued by the communication path establishment requesting equipment 71 (901), the packet switching equipment A 11 determines the required maintenance condition for a link for the next hop according to the service identifier and the service's attributes, contained in the received path establishment request, with reference to the service definition table 8011 (9011). Next, the packet switching equipment A 11 determines the link for the next hop according to the required maintenance condition with reference to the link attribute definition table 8010 (9012). Further, the packet switching equipment A 11 determines the adaptations according to the service identifier and the service's attributes with reference to the service definition table 8011 (9013). The determined next hop's link and adaptations are stored in the session management table 8020 and used when an RESV message is received later (9071 and 9072). According to an operation conforming to the GMPLS extended RSVP-TE standard, the packet switching equipment A 11 transfers the PATH message to the next hop. At this time, the service identifier and the service's attributes are transferred without any change.

Thereafter, the PATH message is transferred along the route specified in the explicit route object 1005 of the PATH message to the packet/wavelength coordinated switching equipment A 13, the packet/wavelength coordinated switching equipment B 14, and the packet switching equipment B 12 in that order, and the same processing as described above is repeated (902, 9021 to 9023, 903, 9031 to 9033, 904, and 9041 to 9043).

Since the packet switching equipment B 12 is the destination node of the requested communication path, the packet switching equipment B 12 performs processing performed upon reception of an RESV message, after the processing (9041 to 9043) performed upon reception of the PATH message. Specifically, the packet switching equipment B 12 configures the adaptations and the cross connection in the interface parts and the switch part according to determined link information and adaptation information (9044 and 9045).

Thereafter, according to an operation conforming to the GMPLS extended RSVP-TE standard, the RESV message is sequentially transferred to the previous hop (905, 906, and 907). The other GMPLS switches included in the route also configure the adaptations and the cross connection in the interface parts and the switch parts (9051, 9052, 9061, 9062, 9071, and 9072).

Note that, when the next hop is determined, if the link for the next hop has not been established, the sequence of establishing a new communication path is activated with the local GMPLS switch serving as the source node. For example, when the packet/wavelength coordinated switching equipment A 13 detects that the packet link (LSC-LSP) 55 has not been established, while the PSC-LSP 31 is being established (9022), the packet/wavelength coordinated switching equipment A 13 generates a new session identifier for the packet link (LSC-LSP) 55 establishment, for the wavelength switching equipment A 15, and sends a PATH message to the wavelength switching equipment A 15.

As described above, the communication path is established between the packet switching equipment A 11 and the packet switching equipment B 12.

FIG. 11 is a diagram showing the structure of the service definition table 8011.

The service definition table 8011 includes columns for the condition for the specified service identifier 1101, the condition for the specified service attributes 1102, the required maintenance condition 1103, and the adaptation specifications 1104.

Each record indicates an if-then rule used to determine the required maintenance condition 1103 and the adaptation specifications 1104 based on a received path establishment request.

As described above with reference to FIG. 9, the signaling protocol processing part 8014 evaluates whether the service identifier 1003 and the service attribute 1004, which are contained in the received path establishment request, satisfy the condition for the specified service identifier 1101 and the condition for the specified service attributes 1102 in each record. When the conditions are satisfied, the signaling protocol processing part 8014 employs the values of the required maintenance condition 1103 and the adaptation specifications 1104 in the corresponding record, as an achievable maintenance condition and adaptations for the communication path.

For example, since the service identifier 1003 and the service attribute 1004 included in the path establishment request message for the PSC-LSP 31 shown in FIG. 8B satisfy the conditions specified in the first record of the service definition table 8011, the required maintenance condition for the communication path is determined to be "max_fail_time<1 sec, maintenance_time=acceptable_down_time". This indicates that the service suspension time should be less than 1 second and the maintenance time should be within a period of "acceptable_down_time" (i.e., 22:00 to 3:00) described in the service attribute 1004. Similarly, the adaptations are determined to be "notifyFaultDetection=enabled".

In the same way, since the values for the PSC-LSP 32 shown in FIG. 8C satisfy the conditions specified in the fourth record of the service definition table 8011 and the values for the PSC-LSP 33 shown in FIG. 8D satisfy the conditions specified in the fifth record of the service definition table 8011, the values of the required maintenance condition 1103 and the adaptation specifications 1104 in the corresponding record are employed.

FIG. 12 is a diagram showing the structure of the link attribute definition table 8010.

The link attribute definition table 8010 includes columns for a switching capability 1201, a local interface 1202, a remote equipment's router identifier 1203, a remote equipment's interface identifier 1204, an operational state 1205, a lower-layer's session identifier 1206, and a link's achievable maintenance condition 1207.

Among the records included in the link attribute definition table 8010, each record having "PSC" specified in the switching capability 1201 represents one packet link and each record having "LSC" specified in the switching capability 1201 represents one wavelength link.

FIG. 12 shows the values specified in the packet/wavelength coordinated switching equipment A 13, for example.

Each record having no value in the lower-layer's session identifier 1206 indicates an LSP in which the lower layer is not controlled by GMPLS.

Each record having "LSC" stored as the value of the lower-layer's session identifier 1206 indicates that an LSC-LSP can be established but has not been established yet. Each record having "LSC" and a session identifier stored as the value of the lower-layer's session identifier 1206 indicates that an LSC-LSP has already been established.

FIG. 13 is a diagram showing the structure of the session management table 8020.

The session management table 8020 includes columns for RSVP information 1301 and adaptation specifications 1302.

The RSVP information 1301 is divided into a session identifier 13011, a previous hop 13012, a next hop 13013, a service identifier 13014, service's attributes 13015, and an explicit route object 13016.

FIG. 13 shows the values specified in the packet/wavelength coordinated switching equipment A 13, for example. The first, second, and third records of the session management table 8020 correspond to the PSC-LSP 31, the PSC-LSP 32, and the PSC-LSP 33, respectively.

Although the IF_ID value of the next hop was not specified in the explicit route object 1005 of the path establishment request message received from the previous hop, the value determined by the direction, or degree, decision process of the signaling protocol processing part 8014 is stored.

For the PSC-LSP 31, an adaptation operational value determined by the adaptation decision process of the signaling protocol processing part 8014 is stored in the adaptation specifications 1302.

The values of the previous hop 13012, the next hop 13013, and a label are used to configure the packet switch part, thereby establishing the communication path. The label is handled in the same way as in the GMPLS standard, so a description thereof is omitted.

For the PSC-LSP 31, the value of the adaptation specifications 1302 is specified in the packet interface part, so that a fault alarm that has occurred in the wavelength layer is transferred to the packet layer.

FIG. 14 is a diagram showing the structure of the network topology table 8018.

The network topology table 8018 includes columns for a switching capability 1401, an operational state 1402, a link termination point A 1403, and a link termination point B 1404.

The contents of the network topology table 8018 are generated when the routing protocol processing part 8017 sends and receives the switching capability 1201, the local interface 1202, the remote equipment's router identifier 1203, the remote equipment's interface identifier 1204, and the operational state 1205 of the link attribute definition table 8010.

Figure 15:
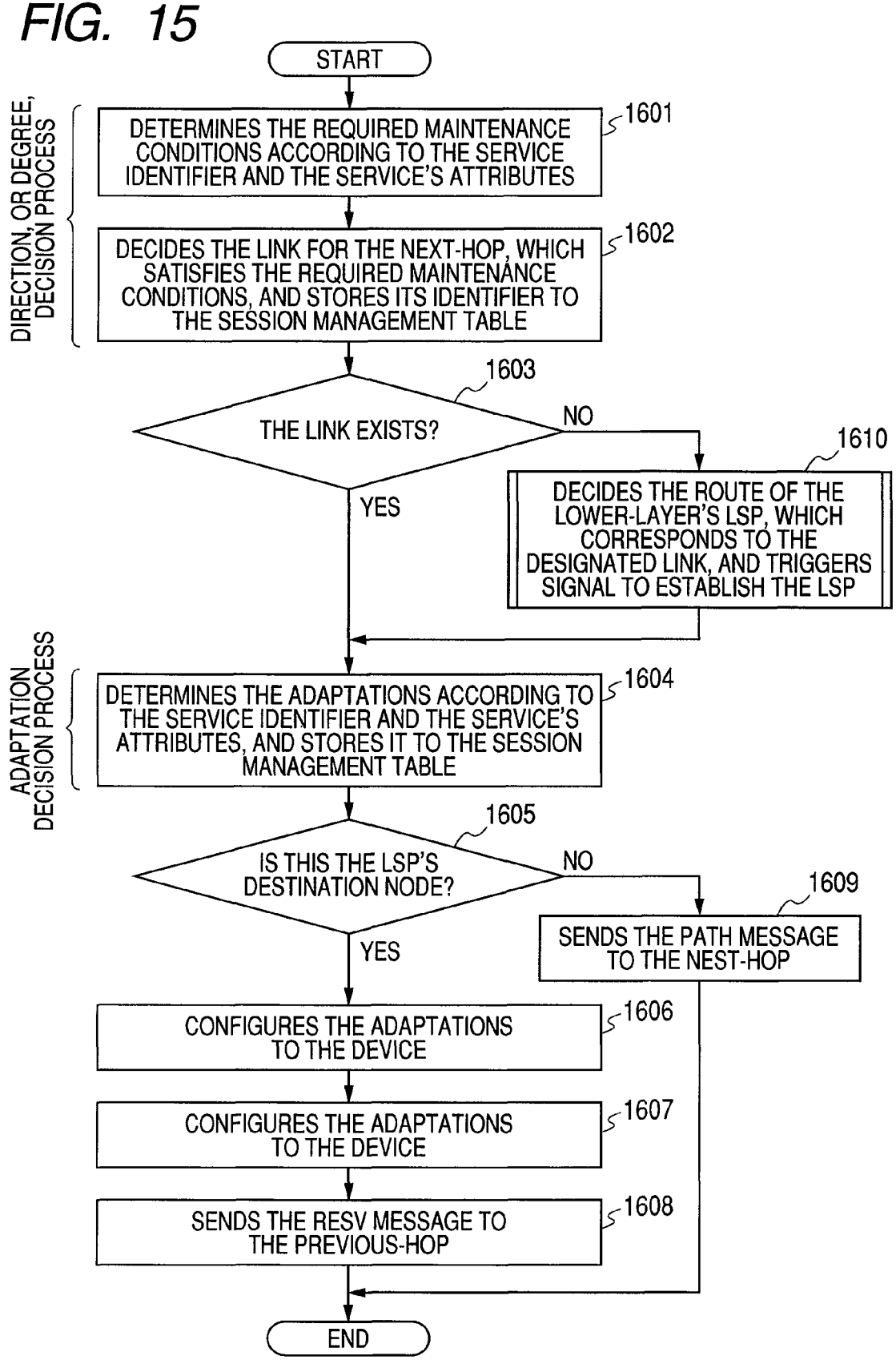
FIG. 15 is a flowchart of an operation performed when a PATH message is received, in the first embodiment.

FIG. 15 is a flowchart of an operation performed when the signaling protocol processing part 8014 receives a PATH message (path establishment request).

When a PATH message is received, the required maintenance condition for a link for the next hop is determined according to the service identifier 1003 and the service attribute 1004, contained in the received PATH message, with reference to the service definition table 8011, and is stored in the session management table 8020 (1601). This processing is realized by extracting the required maintenance condition 1103 from the record that includes the condition for the specified service identifier 1101 and the condition for the specified service attributes 1102 of the service definition table 8011, which are satisfied by the service identifier 1003 and the service attribute 1004, respectively.

Next, the link for the next hop is decided according to the required maintenance condition with reference to the link attribute definition table 8010 (1602). This processing is realized by extracting, from the link attribute definition table 8010, the record of the link's achievable maintenance condition 1207 that satisfies the condition expression of the required maintenance condition 1103 determined in Step 1601.

Next, it is determined whether the decided link has been established, with reference to the lower-layer's session identifier 1206 of the link attribute definition table 8010 (1603). It is determined that the link has not been established when only the value of "LSC" is stored in the lower-layer's session identifier 1206.

When it is determined that the link has not been established, the communication path's route computation part 8019 is requested to calculate and decide the route of the lower-layer communication path, and a signal to establish the communication path is triggered (1610). This establishment request processing is the same as that performed when the packet switching equipment A 11 is requested by the communication path establishment requesting equipment 71 to establish a communication path, so a description thereof is omitted.

The adaptations are determined according to the service identifier 1003 and the service attribute 1004 with reference to the service definition table 8011 and stored in the session management table 8020 (1604). This processing is realized by extracting the adaptation specifications 1104 from the record that includes the condition for the specified service identifier 1101 and the condition for the specified service attributes 1102 of the service definition table 8011, which are satisfied by the service identifier 1003 and the service attribute 1004, respectively.

When the local node is the destination node of the communication path requested by the received PATH message (1605), the adaptations determined in Step 1604 are specified in the interface part (1606) and cross connection is specified in the switch part by using the next-hop link information determined in Step 1602 (1607). At this time, upstream-side link information and upstream-side and downstream-side label values are required. Since a method of obtaining them is equivalent to that used in the GMPLS extended RSVP-TE standard, a description thereof is omitted. Then, according to the GMPLS extended RSVP-TE standard, an RESV message is generated and transferred to the upstream.

When it is determined in Step 1605 that the local node is not the destination node of the communication path requested by the received PATH message, in other words, when the local node is an intermediate node of the communication path, the PATH message is sent to the next hop (1609). A method of determining a PATH message to be transferred is equivalent to that used in the GMPLS extended RSVP-TE standard, so a description thereof is omitted. However, the service identifier 1003 and the service attribute 1004, which are received from the upstream, are attached to the PATH message to be transferred to the downstream without any change.

Figure 16:
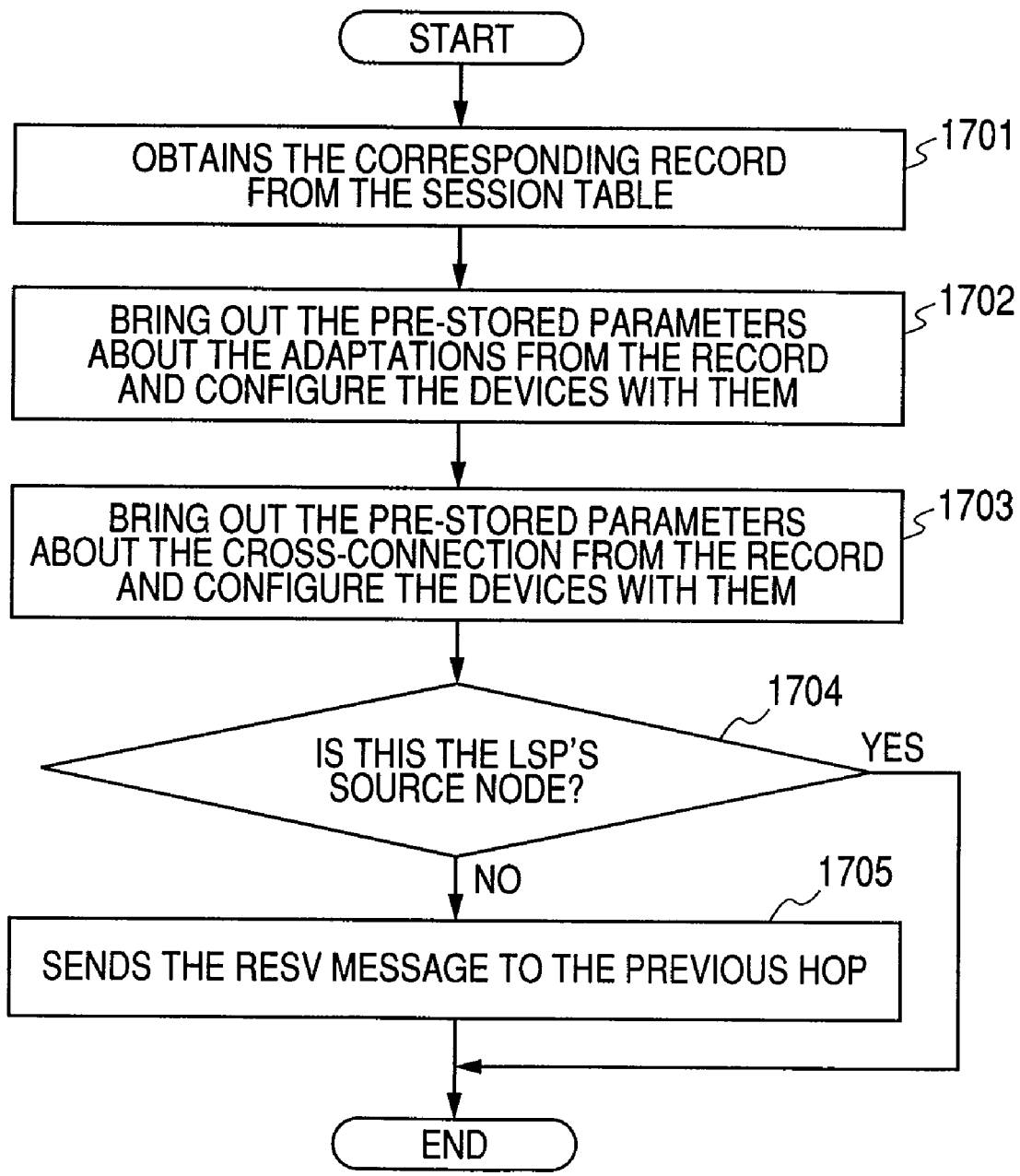
FIG. 16 is a flowchart of an operation performed when an RESV message is received, in the first embodiment.

FIG. 16 is a flowchart of an operation performed when the signaling protocol processing part 8014 receives an RESV message.

When an RESV message is received, the record corresponding to the session identifier 1002 contained in the received message is extracted from the session management table 8020 (1701). The adaptation specifications are extracted from the record and specified in the interface part (1702). The next-hop link information is extracted from the record and the cross connection is specified in the switch part with next-hop link information (1703). These processes are the same as those in Steps 1606 to 1607.

Then, it is determined whether the local node is the source node of the requested communication path (1704). When the local node is not the source node, the RESV message is transferred to the previous hop according to the GMPLS extended RSVP-TE standard (1705).

When the local node is the source node, the communication path is thus established.

As described above, the communication path establishment requesting equipment 71 notifies, using the signaling protocol, the service type and the attribute information unique to each service, to the GMPLS switches through which the communication path travels. The GMPLS switches determine the required maintenance condition according to the notified information, and decide an accommodation relationship and adaptations based on the determination result. As a result, information for controlling the accommodation relationship and information for determining the adaptations can be managed for each communication path, without being exchanged between management systems independent of the communication path establishment control.

Further, when the accommodation relationship and the adaptations are decided according to the service suspension acceptable time, which is one of required maintenance conditions for a service, it is possible to prevent a situation where the maintenance is disabled due to the difference in service suspension acceptable time between communication paths, in a case where the communication paths share network resources such as interfaces.

In this embodiment, while signaling protocols are being exchanged, the GMPLS switches perform the direction, or degree, decision process and the adaptation decision process. However, the processes may be performed in the communication path establishment requesting equipment 71.

In that case, the direction, or degree, decision process and the adaptation decision process of the GMPLS switches, which are executed when the GMPLS switches exchange signaling protocol messages with one another, are virtually performed in the communication path establishment requesting equipment 71. The determined allocation resource and adaptations are specified in the switch parts and the interface parts of the nodes by using a management protocol such as SNMP, CORBA, netconf, or telnet without using a signaling protocol. With this configuration, it is possible to realize path control according to the required maintenance condition in a network that does not have a signaling mechanism.

In this embodiment, the maintenance time included in the link's achievable maintenance condition 1207 is a fixed value which is given in advance. However, the value of the maintenance time may be changed. For example, the links' achievable maintenance conditions may be determined as the function of the required maintenance conditions for multiple communication paths that use links. With this configuration, even in a network in which the maintenance time of each link is not determined in advance, it is possible to prevent a situation where the maintenance is disabled due to the difference in service suspension acceptable time between communication paths, in a case where the communication paths share network resources such as interfaces.

In this embodiment, the direction, or degree, decision process and the adaptation decision process are performed in the controller software 801 of each node. However, those processes may be assigned to an external resource selection management server.

In that case, program steps for the processes 1601, 1602, and 1604 and the service definition table 8011 are stored in the resource selection management server, and the signaling protocol processing part 8014 requests the resource selection management server to perform the direction, or degree, decision process and the adaptation decision process. As a query protocol used between the signaling protocol processing part 8014 and the resource selection management server, PCEP (IETF, Internet draft, draft-ietf-pce-pcep-07.txt, J P. Vasseur, Ed. and others, Mar. 2, 2007) can be used. With this configuration, the service definition table and the direction, or degree, decision process and the adaptation decision process can be collectively disposed in a smaller number of resource selection management servers than that of the GMPLS switches. Therefore, it is easy to change the description content of the service definition table and to add a required maintenance condition type which can be described in the service definition table.

The present invention can be applied to a network system in which communications are performed using established communication paths. Particularly, it is preferred that the present invention be applied to a GMPLS or MPLS network in which LSPs are established with a GMPLS or MPLS signaling protocol or with an MPLS RSVP-TE protocol.

What is claimed is:

1. A communication network system comprising plural data transfer equipment elements of data transfer equipment, the communication network system establishing a communication path by transferring a communication path establishment control signal among at least two of the data transfer equipment elements,
    wherein the data transfer equipment comprises a control information forwarding means;
    wherein the communication path establishment control signal includes a service identifier of a service provided by the communication path and a service attribute which characterizes the service identified by the service identifier,
    wherein the data transfer equipment holds an achievable maintenance condition for each network resource that is an attribute related to maintenance of the network resource;
    wherein the data transfer equipment specifies a required maintenance condition for the communication path to be established by the communication path establishment control signal including the service identifier and the service attribute; and
    wherein the data transfer equipment compares the specified required maintenance condition with the achievable maintenance condition to select a network resource that satisfies the required maintenance condition as a network resource used for the communication path to be established by the communication path establishment control signal; and
    wherein the data transfer equipment includes:
    a service definition table in which a service identifier, a service attribute, a requirement for maintenance, and adaptation are recorded in association with one another,
    wherein the achievable maintenance condition is included in a link attribute table in which a link and a maintenance attribute of the link are recorded in association with each other; and
    the data transfer equipment uses the service definition table to determine the required maintenance condition that should be satisfied by links for hops of a communication path to be established, on the basis of a received service identifier and service attribute, extracts a plurality of links of which maintenance attributes satisfy the determined requirement for maintenance, from the link attribute table, and either determines a candidate for a route of the communication path which satisfies the requirement for maintenance in relation to each of the hops, in a network formed with the extracted plurality of links, or determines an adaptation by searching the service definition table on the basis of the service identifier and service attribute.

2. The communication network system according to claim 1,
    wherein the communication network system is configured by multiple management domains or multiple layers, or both; and
    wherein the data transfer equipment controls an adaptation for each communication path established between the management domains or layers.

3. The communication network system according to claim 2, wherein the adaptation has an encapsulation function applied to data transferred by the data transfer equipment.

4. The communication network system according to claim 2, wherein the adaptation has a data-flow distribution or aggregation function for data being transferred by the data transfer equipment.

5. The communication network system according to claim 2, wherein the adaptation has a function of selectively transferring a management alarm for data transferred by the data transfer equipment.

6. The communication network system according to claim 2, wherein the adaptation has a QoS (Quality of Service) mapping function applied to data transferred by the data transfer equipment.

7. The communication network system according to claim 2, wherein the adaptation has a code conversion function applied to data transferred by the data transfer equipment.

8. The communication network system according to claim 1, further comprising resource selection management equipment,
- wherein the data transfer equipment includes:
  - a unit to send a resource selection request to the resource selection management equipment;
  - a unit to receive a resource selection result; and
  - a unit to establish the communication path by transferring the communication path establishment control signal, based on the resource selection result;
- wherein the resource selection request includes the service identifier and the service attribute;
- wherein the resource selection management equipment specifies a required maintenance condition for the communication path to be established by the communication path establishment control signal, based on the service identifier and the service attribute;
- wherein the resource selection management equipment holds an achievable maintenance condition for each of network resources that constitute the communication network system; and
- wherein the resource selection management equipment compares the required maintenance condition with the achievable maintenance condition to select a network resource that satisfies the required maintenance condition.

9. The communication network system according to claim 8,
- wherein the communication network system is configured by multiple management domains or multiple layers, or both;
- wherein the data transfer equipment controls an adaptation for each communication path established between the management domains or layers;
- wherein the resource selection management equipment determines an adaptation to be used and a setting parameter for the adaptation, based on the service identifier and the service attribute; and
- wherein the data transfer equipment configures the adaptation based on the determined adaptation and the determined setting parameter for the adaptation.

10. The communication network system according to claim 1, wherein the required maintenance condition for the communication path and the achievable maintenance condition for the network resource include information on a period of time for which the service is to be provided.

11. The communication network system according to claim 1, wherein the required maintenance condition for the communication path and the achievable maintenance condition for the network resource include information on an acceptable period of time for which the service is to be suspended.

12. The communication network system according to claim 1, wherein a type of the communication path establishment control signal is either MPLS (Multiprotocol Label Switching) or GMPLS (Generalized Multi-Protocol Label Switching) extended RSVP (ReserVation Protocol).

13. The communication network system according to claim 1,
- wherein the data transfer equipment includes a session management table in which a session identifier, a service identifier, a service attribute, an explicit route, and adaptation are recorded in association with one another; and
- wherein the data transfer equipment records the determined information in the session management table in association with the service identifier, service attribute, and explicit route.

14. The communication network system according to claim 13,
- wherein in response to receiving a path establishment response (RESV) from a downstream node, the data transfer equipment of a node receiving the RESV designates an interface unit on the basis of an adaptation recorded in the session management table.

15. The communication network system according to claim 1,
- wherein the data transfer equipment is at a path end point, sets up adaptation based on the determined adaptation and cross-connection in an interface unit and switching unit based on next hop link information, and transfers a path establishment response message to a node in which a previous hop is terminated.

* * * * *